(12) United States Patent
Sandoval Leon et al.

(10) Patent No.: US 10,710,586 B2
(45) Date of Patent: Jul. 14, 2020

(54) SYSTEMS AND METHODS FOR IDLE COASTING MANAGEMENT

(71) Applicant: Cummins Inc., Columbus, IN (US)

(72) Inventors: Jairo Andres Sandoval Leon, Columbus, IN (US); Vivek Anand Sujan, Columbus, IN (US); Tejas Shrikant Kinjawadekar, Pune (IN)

(73) Assignee: Cummins Inc., Columbus, IN (US)

( * ) Notice: Subject to any disclaimer, the term of this patent is extended or adjusted under 35 U.S.C. 154(b) by 149 days.

(21) Appl. No.: 15/962,249

(22) Filed: Apr. 25, 2018

(65) Prior Publication Data

US 2018/0237017 A1 Aug. 23, 2018

Related U.S. Application Data

(63) Continuation of application No. PCT/US2016/059694, filed on Oct. 31, 2016.
(Continued)

(51) Int. Cl.
| | |
|---|---|
| *B60W 30/18* | (2012.01) |
| *B60W 10/02* | (2006.01) |
| *B60W 50/00* | (2006.01) |
| *B60W 10/06* | (2006.01) |
| *B60T 7/18* | (2006.01) |

(Continued)

(52) U.S. Cl.
CPC ......... *B60W 30/18072* (2013.01); *B60T 7/18* (2013.01); *B60T 7/22* (2013.01); *B60W 10/02* (2013.01); *B60W 10/06* (2013.01); *B60W 10/10* (2013.01); *B60W 50/0097* (2013.01); *B60T 2210/20* (2013.01); *B60T 2210/30* (2013.01); *B60W 2030/1809* (2013.01);
(Continued)

(58) Field of Classification Search
CPC ... B60W 30/18072; B60W 2030/1809; B60W 50/0097; B60W 2520/10; B60W 30/18
See application file for complete search history.

(56) References Cited

U.S. PATENT DOCUMENTS

| | | |
|---|---|---|
| 6,374,173 B1 | 4/2002 | Ehlbeck |
| 6,990,401 B2 | 1/2006 | Neiss et al. |

(Continued)

FOREIGN PATENT DOCUMENTS

| | | |
|---|---|---|
| WO | 2013095237 | 6/2013 |
| WO | 2013095239 | 6/2013 |

(Continued)

OTHER PUBLICATIONS

Search Report and Written Opinion, PCT Appln. No. PCT/US2016/59694, dated Jan. 9, 2017, 9 pgs.

*Primary Examiner* — David R Morris
(74) *Attorney, Agent, or Firm* — Taft Stettinius & Hollister LLP

(57) ABSTRACT

A system, method, and apparatus includes management of coasting during operation of a vehicle. Speed of a vehicle is monitored during a coasting event and is compared against a threshold to determine whether to remain coasting or re-engage an engine to a driveline. If instantaneous speed exceeds the threshold, predicted speed can be used to determine whether to permit short duration excursions, or to re-engage the engine to the driveline. These techniques can be used whether the vehicle is slowing down below a threshold or speeding up above a threshold.

20 Claims, 26 Drawing Sheets

Related U.S. Application Data

(60) Provisional application No. 62/248,728, filed on Oct. 30, 2015.

(51) Int. Cl.
  *B60T 7/22*    (2006.01)
  *B60W 10/10*   (2012.01)

(52) U.S. Cl.
  CPC ..... *B60W 2520/10* (2013.01); *B60W 2552/15* (2020.02); *B60W 2710/021* (2013.01); *B60W 2710/10* (2013.01)

(56) References Cited

U.S. PATENT DOCUMENTS

| | | | |
|---|---|---|---|
| 8,494,737 B2 | 7/2013 | Maier et al. | |
| 8,498,795 B2 | 7/2013 | Eriksson et al. | |
| 8,744,718 B2 | 6/2014 | Johansson et al. | |
| 9,849,880 B2 * | 12/2017 | D'Amato | B60W 30/143 |
| 2009/0132142 A1 | 5/2009 | Nowak et al. | |
| 2009/0164081 A1 | 6/2009 | Meloche et al. | |
| 2011/0106388 A1 | 5/2011 | Boeckenhoff et al. | |
| 2012/0283928 A1 | 11/2012 | Bjernetun et al. | |
| 2013/0166164 A1 | 6/2013 | Moebus | |
| 2014/0156163 A1 | 6/2014 | Shin et al. | |
| 2014/0236448 A1 | 8/2014 | Eriksson et al. | |
| 2015/0088349 A1 | 3/2015 | Akashi et al. | |
| 2016/0297435 A1 * | 10/2016 | D'Amato | B60W 30/143 |
| 2017/0129492 A1 * | 5/2017 | Follen | B60W 50/0097 |
| 2018/0265090 A1 * | 9/2018 | Sharma | B60W 30/18072 |

FOREIGN PATENT DOCUMENTS

| | | |
|---|---|---|
| WO | 2014003652 | 1/2014 |
| WO | 2014003654 | 1/2014 |
| WO | 2014011105 | 1/2014 |

* cited by examiner

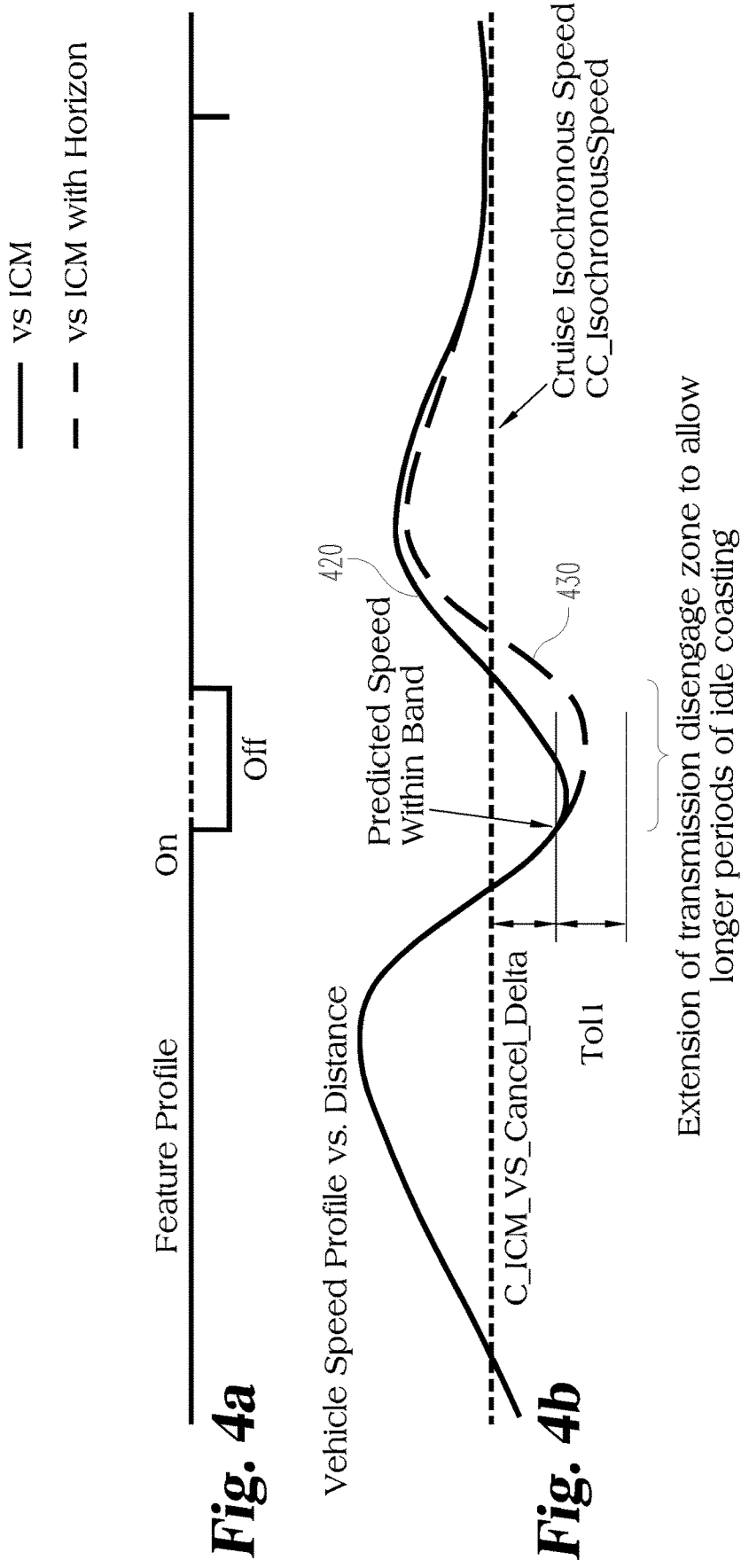

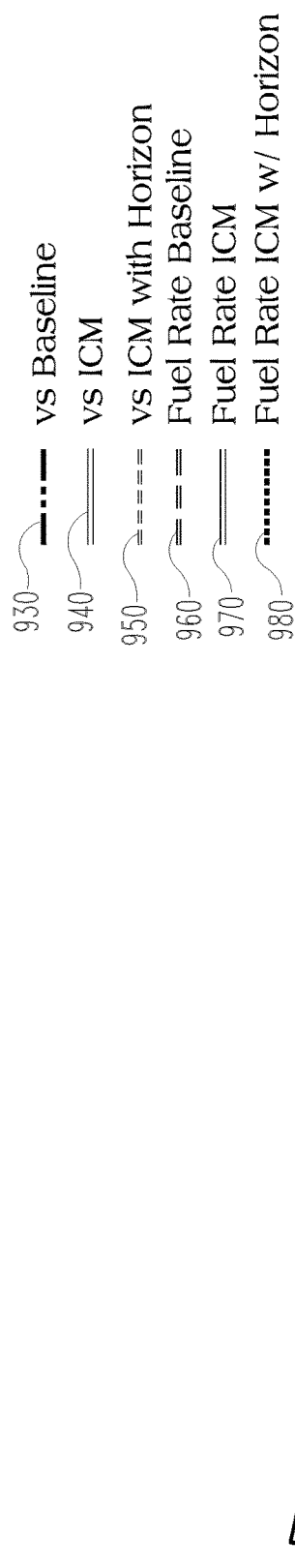
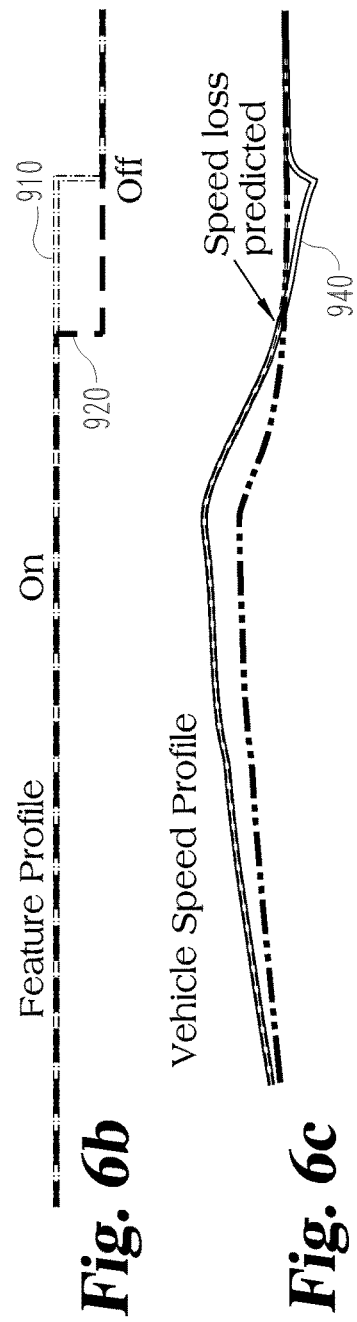
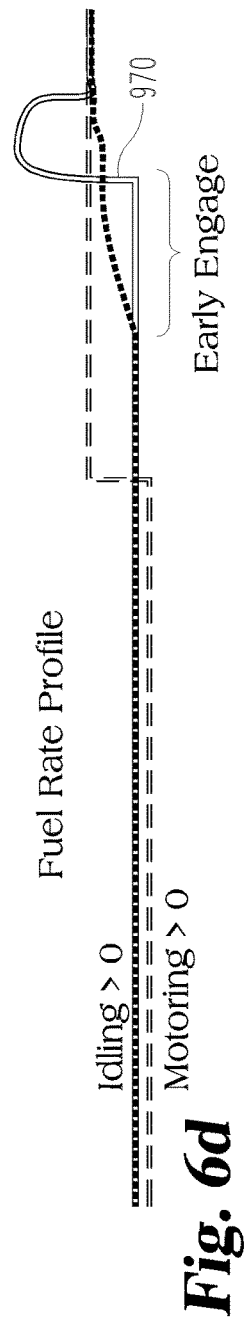
*Fig. 6a* Terrain Profile vs. Distance
*Fig. 6b* Feature Profile
*Fig. 6c* Vehicle Speed Profile
*Fig. 6d* Fuel Rate Profile

| Variable Name | Parameter Name | Description | Default Value | Unit |
|---|---|---|---|---|
| Tol1 | | Tolerance 1: Speed delta below C_ICM_VS_CancelDelta, acts as threshold for predicted vehicle speed for Keep Disengaged Flag | 1.5 | Km/hr |
| Tol2 | | Tolerance 2: Speed delta below C_ICM_VS_CancelDelta, acts as threshold for predicted vehicle speed for Early Reengage Flag | 1.5 | Km/hr |
| Tol3 | | Tolerance 3: Speed delta below C_ICM_VS_CancelDelta, used to protect for incorrect speed prediction and prevent vehicle speed from dropping too low. | 2 | Km/hr |
| Tol4 | | Tolerance 4: Speed delta above C_ICM_VS_CancelDelta, threshold for current vehicle speed in early reengage condition. | 2 | Km/hr |
| DeltaX1 | | Estimation window for vehicle speed prediction for Extended Disengagement. Expected value is equal to horizon data resolution distance | 100 | m |
| DeltaX2 | | Estimation window for vehiclespeed prediction for Early Reengage. Integer multiple of horizon data resolution distance | 200 | m |

*Fig. 26*

SYSTEMS AND METHODS FOR IDLE COASTING MANAGEMENT

CROSS-REFERENCE TO RELATED APPLICATIONS

The present application is a continuation of International Patent Application No. PCT/US16/59694 filed on Oct. 31, 2016, which claims the benefit of the filing date of U.S. Provisional Application No. 62/248,728 filed on Oct. 30, 2015, each of which is incorporated herein by reference in its entirety for all purposes.

BACKGROUND

The present application relates generally to management of coasting in a vehicle for fuel economy improvement, and more particularly to idle coasting management of a vehicle with a manual transmission.

Improved fuel economy for vehicles can be obtained by allowing the vehicle to coast during certain operating and drive cycle conditions. However, these benefits are not heretofore realized with all vehicles, such as those with manual transmissions, where the operator has control over the gear selection. Therefore, there remains a significant need for the apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One example of a system, method, and apparatus includes a manual transmission that is configured to automatically allow the vehicle to coast with the engine disengaged from the driveline at certain drive cycle conditions. Whether the engine remains disengaged from the driveline depends on monitoring speed of vehicle and comparing it against a cancellation delta that can be determined as a function of road grade.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 4a is a depiction of whether an engine is engaged with a driveline.

FIG. 4b depicts a speed profile.

FIG. 6a is a schematic of a vehicle on a downhill grade.

FIG. 6b is a depiction of whether an engine is engaged with a driveline.

FIG. 6c depicts a speed profile.

FIG. 6d depicts a fueling profile.

FIG. 26 depicts possible values for a number of variables used herein.

DETAILED DESCRIPTION OF ILLUSTRATIVE EMBODIMENTS

Figure 1:
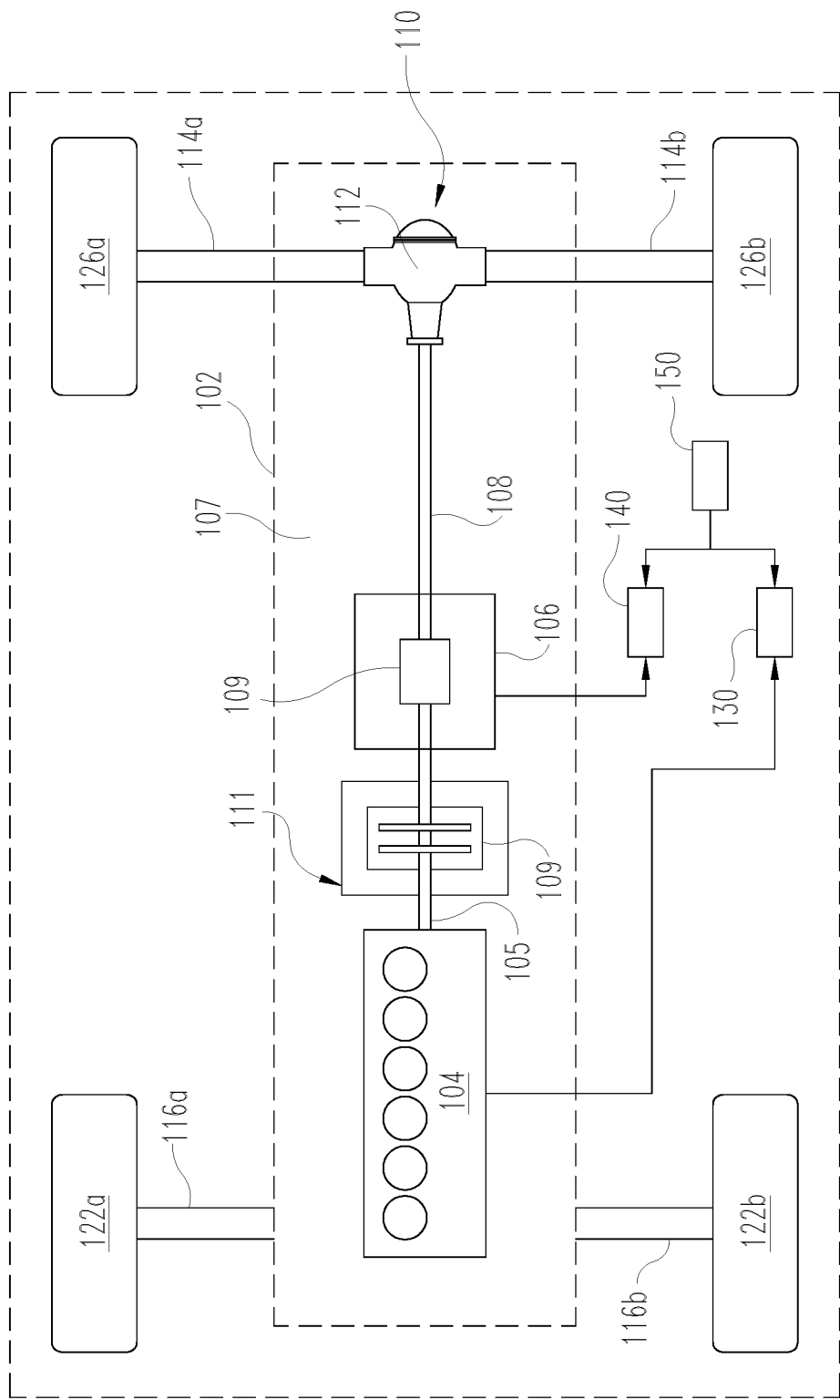
FIG. 1 is a schematic illustration of a vehicle with a controllable manual transmission for coasting management of the vehicle.

With reference to FIG. 1, there is illustrated a schematic view of an exemplary vehicle 100 including a powertrain 102 incorporated within vehicle 100. In the illustrated embodiment, the powertrain 102 includes an engine 104, such as an internal combustion engine, structured to generate power for the vehicle 100. The powertrain 102 further includes a transmission 106 connected to the engine 104 for adapting the output torque of the engine 104 and transmitting the output torque to a driveline 107 including drive shaft 108. In certain embodiments, the transmission 106 is a manual transmission that may be disengageably connected to an engine crankshaft 105 via a clutch 109.

In the rear wheel drive configuration illustrated for vehicle 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle 100 having a front wheel drive configuration, transmission 106 may be a trans axle and final drive 110 may reside at the front of the vehicle 100, connecting front axles 116*a* and 116*b* to the engine 104 via the transaxle. It is also contemplated that in some embodiments the vehicle 100 is in an all-wheel drive configuration.

In the illustrated embodiment, vehicle 100 includes two front wheels 122*a*, 122*b* mounted to front axles 116*a*, 116*b*, respectively. Vehicle system 100 further includes two rear wheels 126*a*, 126*b* mounted to rear axles 114*a*, 114*b*, respectively. It is contemplated that vehicle 100 may have more or fewer wheels than illustrated in FIG. 1. Vehicle 100 may also include various components not shown, such a fuel system including a fuel tank, a front differential, a braking system, a suspension, an engine intake system and an exhaust system, which may include an exhaust aftertreatment system, to name a few examples.

Vehicle 100 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle 100, which is directed to the regulation and control of transmission 106 operation. ECU 130 and TCU 140 are each in electrical communication with a plurality of vehicle sensors (not shown) in vehicle 100 for receiving and transmitting conditions of vehicle 100, such as temperature and pressure conditions, for example. In certain embodiments, the ECU 130 and the TCU 140 may be combined into a single control module, commonly referred to as a powertrain control module (PCM) or powertrain control unit (PCU), or the like. It is contemplated that ECU 130 and/or TCU 140 may be integrated within the engine 104 or transmission 106, respectively. Other various electronic control units for vehicle subsystems are typically present in vehicle system 100, such as a braking system electronic control unit and a cruise control electronic control unit, for example, but such other various electronic control units are not show in vehicle 100 to preserve clarity.

Vehicle system 100 further includes a cycle efficiency management (CEM) module 150, which may be directed to the control of the operations described herein and/or directed toward an intermediary control for the regulation and control of the powertrain 102 in vehicle system 100. In the illustrated embodiment, CEM module 150 is in electrical communication with each of the ECU 130 and TCU 140. In certain embodiments, at least a portion of the CEM module 150 may be integrated within the ECU 130 and/or TCU 140. CEM module 150 may further be in electrical communication with one or more of the plurality of vehicle sensors in vehicle 100 for receiving and transmitting conditions of vehicle 100, such as temperature and pressure conditions, route conditions, terrain conditions, speed conditions, and weather conditions, for example. It is contemplated that at least a portion of the conditions and/or measured inputs used for interpreting signals by the CEM module 150 may be received from ECU 130 and/or TCU 140, in addition to or alternatively to the plurality of vehicle sensors. Furthermore, the CEM module 150 may include a processor or controller and be a control unit.

The CEM module 150 includes stored data values, constants, and functions, as well as operating instructions stored on, for example, a computer readable medium. Any of the operations of exemplary procedures described herein may be performed at least partially by the CEM module 150. In certain embodiments, the controller includes one or more modules structured to functionally execute the operations of the controller. The description herein including modules emphasizes the structural independence of the aspects of the CEM module 150, and illustrates one grouping of operations and responsibilities of the CEM module 150. Other groupings that execute similar overall operations are understood within the scope of the present application. Modules may be implemented in hardware and/or instructions on computer readable medium, and modules may be distributed across various hardware or computer readable medium components. More specific descriptions of certain embodiments of controller operations are included in the section referencing FIG. 2. Operations illustrated are understood to be exemplary only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
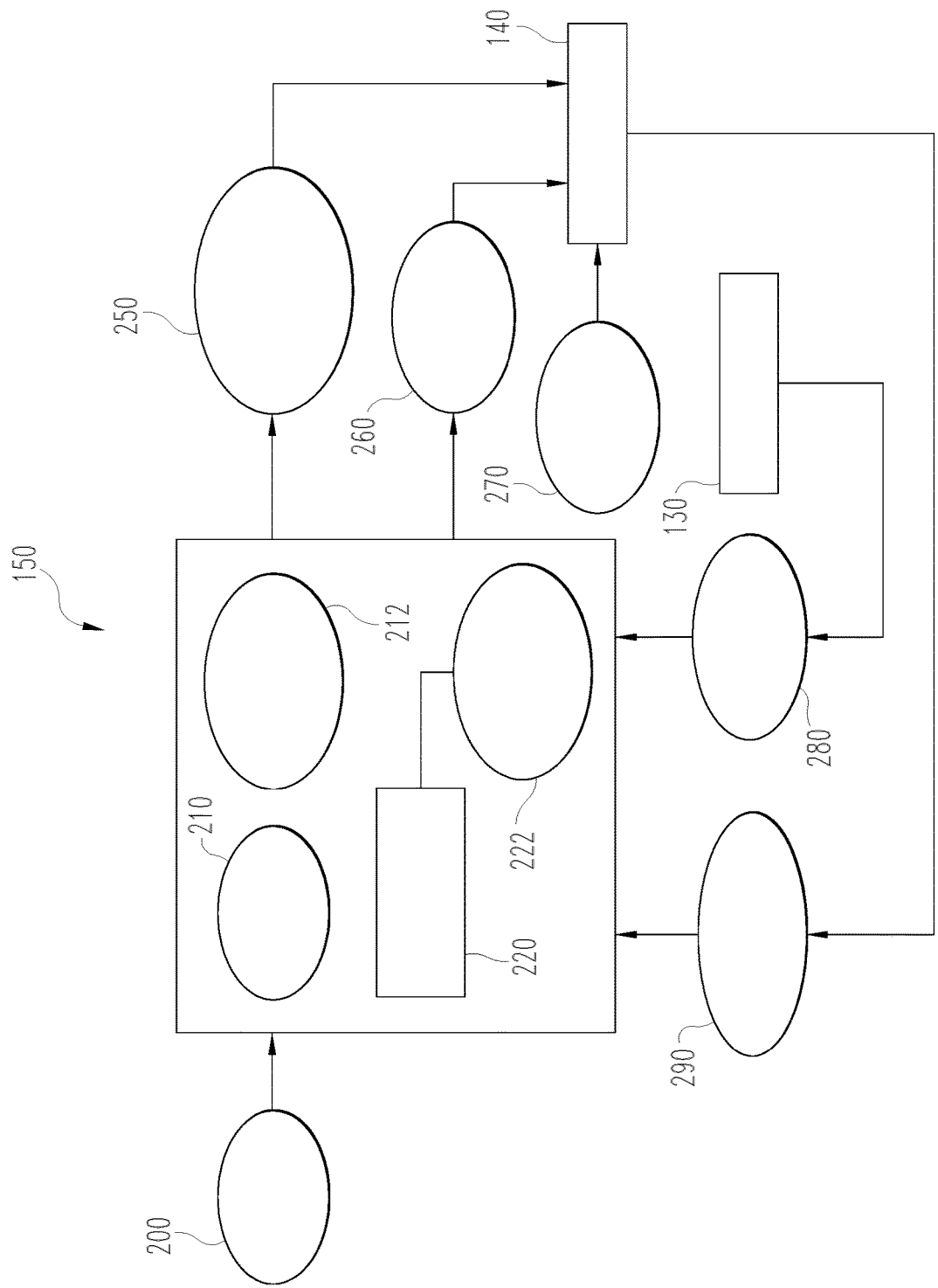
FIG. 2 is a schematic illustration of a controller for coasting management of a vehicle.

One exemplary embodiment of CEM module 150 is shown in FIG. 2. The CEM module 150 may include an engine fueling map 210, an engine braking/friction map 212, and a coasting management module 220, among other modules. Example other modules include an operations cost module, a vehicle speed management module, a fuel quantity management module, a transient torque management module, a transmission arbiter module, a cruise control arbiter module, a throttle arbiter module, and an operator override module. Other arrangements that functionally execute the operations of the CEM module 150 are contemplated in the present application. For example, additional CEM module and cruise control operation aspects with which the present invention may have application may be found with reference to U.S. Provisional Application Ser. No. 61/941,850 filed on Feb. 19, 2104, and U.S. patent application Ser. No. 14/261,010 filed on Apr. 24, 2014, each of which is incorporated herein by reference for all purposes.

In certain embodiments, the CEM module 150 receives operating inputs 200, such as a fuel amount input, a weather conditions input from one or more sensors and/or one or more external devices for detecting weather conditions, and a route conditions input from one or more sensors and/or one or more external devices for detecting route conditions. The fuel amount may include the amount of fuel remaining in the fuel tank. The weather conditions may include a humidity level, a wind condition, and a precipitation condition. The route conditions may include a trip distance, an elevation profile, a route grade profile, a grade length, a maximum speed limit, a minimum speed limit, a traffic condition, and a road condition.

The CEM module 150 illustrated in FIG. 2 includes engine conditions 280 input from the ECU 130 and transmission conditions 290 input from the TCU 140. In certain embodiments, the engine conditions 280 and transmission conditions 290 may be determined from a plurality of sensors positioned throughout vehicle 100. Engine conditions 280 may include a brake actuation parameter, a throttle position parameter, a torque request parameter, an ambient air pressure, an ambient air temperature, an engine temperature, an engine torque, an engine speed, an engine speed rate of change, an engine degrade state, and a brake position. Transmission conditions 290 may include a transmission gear ratio, a current transmission gear, a final drive ratio, a clutch actuator position, and a neutral gear state.

In operation, CEM module 150 is a tool based on a series of operation control modules that provide both anticipated and currently desired vehicle 100 operation behavior to optimize fuel economy. The series of operation control modules are focused on the components of vehicle 100, and more specifically the components of powertrain 102. For a given travel route and one or more route constraints, the recommendations or outputs made by the CEM module 150 is dependent on the operating inputs 200, engine conditions 280, transmission conditions 290, the engine fueling map 210 and the engine braking/friction map 212. Maps 210, 212 may be in the form of multidimensional performance maps, or lookup tables, calibrated offline and provided by the engine manufacturer. It is contemplated that in certain embodiments the engine fueling map 210 may be obtained from the engine braking/friction map 212, while in other embodiments the engine braking/friction map 212 may be obtained from the engine fueling map 210.

CEM module 150 is operable to assume active control of the vehicle 100, regulating a vehicle speed, the engine torque curve, and/or other powertrain 102 operating conditions to ensure optimal vehicle 100 operation, or passive control which allows the operator to take recommended actions. In the present application, CEM module 150 includes coasting management module 220 operable to interpret operating inputs 200, engine conditions 280, and transmission conditions 290 to determine if a coasting opportunity 222 is available, and to automatically (without operator input) disconnect the engine 104 from the driveline 107 in a vehicle with a manual transmission 106 to enable coasting of vehicle 100 to obtain, for example, fuel economy benefits.

In response to coasting management module 220 interpreting or receiving an input that a coasting opportunity is available for vehicle 100 are desired, CEM module 150 outputs, in a first embodiment, a transmission gear command 250 to TCU 140 or, in a second embodiment, a clutch actuator command 260 to TCU 140. Transmission gear command 250 and clutch actuator command 260 each disengage engine 104 from driveline 107 in response to coasting opportunity 222 to provide coasting operation of vehicle 100.

In one embodiment, transmission gear command 250 controls an actuator 119 (shown in FIG. 1 as located within the contours of the manual transmission 106, but it will be appreciated that the actuator 119 can be located elsewhere) that actuates transmission 106 to achieve a neutral gear position to disconnect engine 104 from driveline 107. In another embodiment, clutch actuator command 260 actuates a clutch actuator 111 associated with clutch 109 to disengage clutch 109 and disconnect engine 104 from driveline 107. Transmission 106 gear command 250 or clutch actuator command 260 can be activated by CEM module 150 during cruise control operation of vehicle 100, or anytime when CEM module 150 is active for controlling operations of vehicle 100 in response to certain conditions. Transmission gear command 250 or clutch actuator command 260 can be overridden by operator input 270, such as when the operator increases the throttle position, pushes a brake pedal, or moves a gear level, to re-engage engine 104 to driveline 107 and terminate coasting operation of vehicle 100.

In one embodiment, the transmission gear command 250 is an actuator that achieves a neutral position of the transmission 106 by using a range shift or split shift cylinder to obtain the neutral position. Although not explicitly shown in the figures, it will be appreciated by those in the technical field that either the range shift or split shift cylinder can be located within the contours of the manual transmission 106 or elsewhere. To set forth one non-limiting example, one or more components of either the range or split shift can be located in an auxiliary housing, such as but not limiting to an auxiliary housing located between the manual transmission 106 and the drive shaft 108. A splitter that is typically used for a manual transmission is actuated by actuator 119 to move between high and low split positions so that a neutral position is obtained. In another embodiment, the actuator 119 arranges the splitter so that when fully engaged to the high or low position, a neutral position is obtained since no gear meshes are connected to an output shaft of transmission 106, such as drive shaft 108. In yet another embodiment, a range shift is configured to select neutral in response to the transmission gear command 250. Transmission 106 can be configured so that actuation to the neutral position is obtained without clutch actuation, such as performed in shifting between top gears of some currently available manual transmissions.

Although as discussed above the CEM module 150 can be structured to output a command to disengage the engine 104 from the driveline 107 in response to a coasting opportunity, the CEM module 150 can also be structured to monitor performance of the vehicle 100 and re-engage the engine 104 to the driveline 107 when conditions warrant. Such re-engagement can occur when vehicle speed and/or predicted speed exceeds a threshold, the condition of which can be monitored by the CEM 150 or other suitable module during the coasting event.

Figure 3A:
FIG. 3a is a schematic of a vehicle on a downhill grade.
Figure 3B:
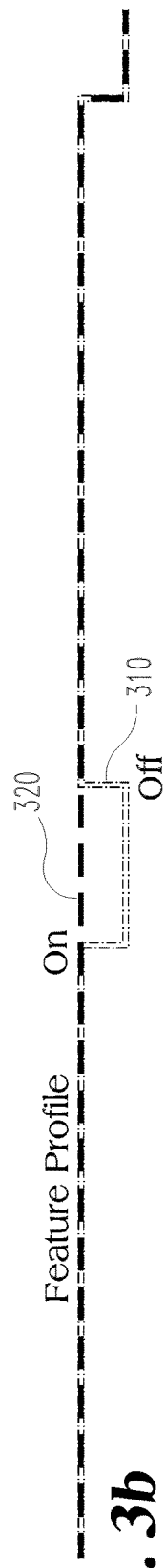
FIG. 3b is a depiction of whether an engine is engaged with a driveline.
Figure 3C:
FIG. 3c depicts a speed profile.
Figure 3D:
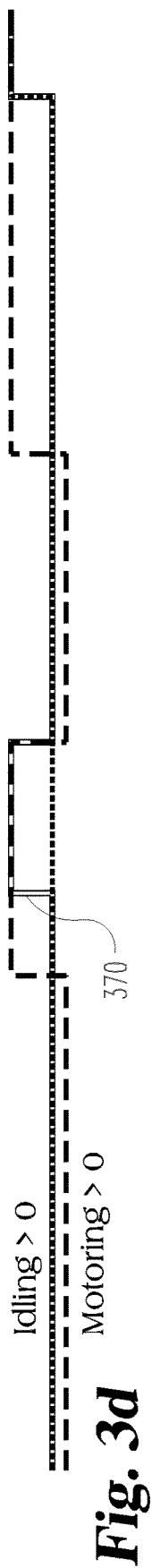
FIG. 3d depicts a fueling profile.

FIGS. 3a-3d depict an embodiment of a coasting control scheme structured to reduce an engagement/disengagement frequency of the engine 104 and driveline 107, and extend a coasting event when a temporary speed loss during the coasting event is predicted to be within a tolerance band. The transmission can be maintained disengaged when vehicle speed loss is predicted to be within a calibratable band to avoid transmission engagement if speed is predicted to recover. Shown in FIG. 3a is a schematic of a vehicle 100 on an overall downhill grade having an intermediate uphill segment. FIGS. 3b-3d depict various control schemes including a baseline cruise control, an intelligent coasting management (ICM) control scheme (e.g. a standard ICM, or simply ICM), and an ICM control scheme with a horizon look-ahead (e.g. ICM with Horizon). Any of the ICM and ICM with Horizon can be implemented in the CEM 150. The ICM with Horizon control scheme will be described in more detail below, but in general includes the ability to look ahead and use future road conditions/grade to influence control system actions. Unless otherwise indicated explicitly to the contrary, as used herein the various embodiments described below in the other figures in which the description refers to future road grades can likewise utilize the full spectrum of look ahead road information not just limited to road grade, such as but not limited to speed limits, road hazards, etc. In this embodiment in FIGS. 3a-3d, it is used to influence a reduction in engagement/disengagement frequency. The ICM with Horizon featured depicted in the figures includes embodiments of the instant application which assist in reducing engagement/disengagement frequency and extend the coasting event.

FIG. 3b depicts operation in ICM in line 310 in which the coasting event is initially ON, is temporarily switched OFF during the intermediate uphill segment, and is then switched ON again after resumption of the downhill coasting event. The coasting event will be understood as a condition in which the engine 104 is disengaged from driveline 107 in response to coasting opportunity, where ON represents a disengagement of the engine 104 from the driveline 107, and OFF represents re-engagement of the engine 107 to the driveline 107. The line 320 in FIG. 3b depicts operation of the ICM with Horizon feature in which the coasting feature remains ON even during the intermediate uphill segment.

FIG. 3c depicts the speed profile of the vehicle in which baseline cruise control is shown in line 330, ICM is shown in line 340, and ICM with Horizon is shown in line 350. FIG. 3d depicts fuel flow rate of the vehicle in which a baseline cruise control is shown in line 360, ICM is shown in line 370, and ICM with Horizon is shown in line 380. A green bracket in FIG. 3d illustrates the extension of the transmission disengage zone to allow longer periods of idle coasting.

FIGS. 4a and 4b depict similar information to that shown above. FIG. 4a shows the engagement/disengagement of the coasting feature, and FIG. 4b shows the divergence in speed from the set speed (also referred to as the cruise isochronous speed, or CC_IsochronousSpeed). The line 410 represents the set speed. The line 420 represents ICM, and the line 430 represents ICM with Horizon. Also shown in FIG. 4 is a Cancel_Delta offset from set speed, as well as an additional tolerance Tol1 beyond the Cancel_Delta. The Cancel_Delta represents a speed at which the control system (e.g. CEM) will disengage the coasting feature, and thus re-engage the engine 104 to the driveline 107, in light of an excessive excursion from the set speed.

The solid line in FIG. 4a represents the ICM coasting feature being disengaged when its speed drops to the Cancel_Delta threshold. The ICM with Horizon feature permits a speed excursion beyond the Cancel_Delta by looking ahead in the terrain and detecting the intermediate but nevertheless sufficiently short duration rise/change in terrain as depicted in FIG. 3a. If speed drops below the Cancel_Delta threshold when operating in ICM with Horizon, so long as the predicted speed remains above the Tol1 line, the coasting feature remains engaged and thus a reduction in engagement/disengagement is realized. The green bracket in FIG. 4b illustrates the extension of the transmission disengagement zone to allow longer periods of idle coasting. A further example of speed dropping below Cancel_Delta but the driveline remaining disengaged based upon predicted speed during operation of ICM with Horizon is discussed below with regard to FIG. 5.

Figure 5:
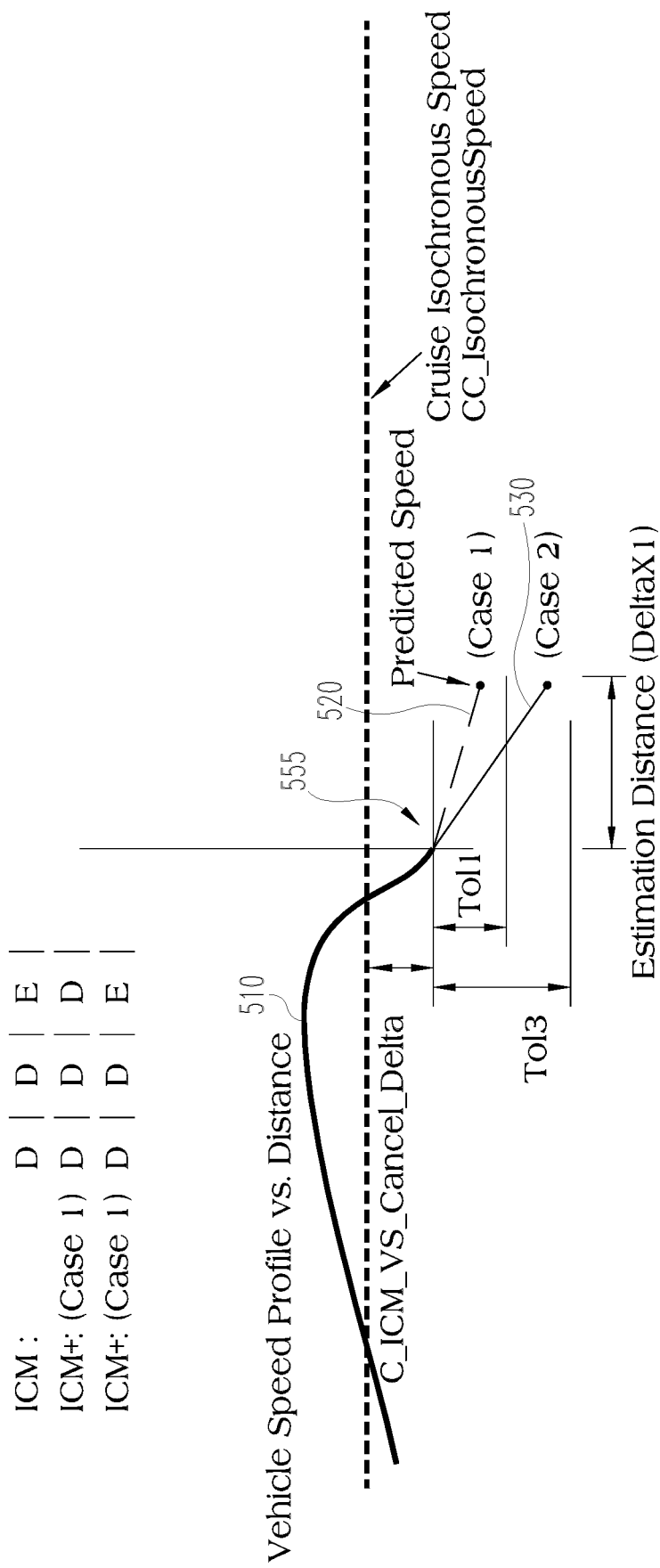
FIG. 5 depicts an embodiment of various cases using predicted speed.

FIG. 5 depicts similar information to that shown above in FIG. 4, albeit with an additional tolerance Tol3 used in conjunction with instantaneous speed. As before, Tol1 is a limit at which the control system will re-engage the engine 104 to the driveline 107 when predicted speed falls below the limit. Tol3 indicates a line at which the control system will also re-engage the engine 104 to the driveline 107 when instantaneous speed drops below the line, regardless if predicted speed remains above Tol1. Thus, in the embodiment depicted in FIG. 5 both Tol1 and Tol3 can be used in conjunction with one another.

FIG. 5 thus illustrates two separate cases. The line 510 on the left side of the figure represents instantaneous speed plotted as a function of time. The ICM with Horizon looks ahead over an estimation distance DeltaX1 at reference point 555 and predicts speed of the vehicle at the estimation distance. In the first case, the line 520 predicts that speed will remain above Tol1, thus the engine 104 and driveline 107 will continue to be commanded to remain disengaged. However, if instantaneous speed drops below the Tol3 line even though estimated speed remains above Tol1, ICM with Horizon can command re-engagement of the engine 104 to the driveline 107. In the second case, the line 530 predicts that speed will drop below Tol1, thus the engine 104 and driveline 107 will be commanded to re-engage.

Predicting vehicle speed can be accomplished in a number of manners, one of which includes using a physics based model of vehicle forces to numerically predict a change in speed.

In one embodiment vehicle coasting can be described by an equation that considers a number of forces impacting speed, such as engine forces, braking forces, aerodynamic forces, rolling resistance, road grade forces, and driveline losses. Such an equation can take the form of the following:

$$m_e \frac{dv}{dt} = F_{engine} - F_{brake} - F_{Aero} - F_{Rolling} - F_{Grade} - F_{Driveline}$$

In one particular embodiment in which the vehicle is coasting the engine and braking forces can be assumed zero. The variables in the above equation can be defined as follows:

$m_e$ is the effective vehicle mass, $m_e = m + m_r$; m is vehicle mass; $m_r$ is effective inertia mass of the rotating components;

v is vehicle speed $F_{engine}$ is the force from the engine at the wheels, $F_{engine}$ = (Engine Torque−Accessory Torque)*Axle Ratio*Transmission Gear Ratio/Wheel Radius $F_{brake}$ is the brake force from the service brakes $F_{Aero}$ is the aerodynamic resistance force, $F_{Aero} = \frac{1}{2} \rho_{Air} * C_d * A * v^2$; $\rho_{Air}$ is ambient air density; $C_d$ is drag coefficient; A is frontal area.

$F_{Rolling}$ is the rolling resistance force, $F_{Rolling} = C_{rr} * m * g * \cos(\theta)$; $C_{rr}$ is rolling resistance coefficient [lb/lb]; g is gravitational acceleration; θ is road angle, θ[rad]=tan$^{-1}$(Road Grade [%]/100)

$F_{Grade}$ is the grade or gravitational force, $F_{Grade} = m * g * \sin(\theta)$ $F_{Driveline}$ is the transmission and final drive losses.

Re-arranging the equation and expanding on relevant concepts, the equation can be expressed as follows:

$$(m + m_r) \frac{dv}{dt} = (T_{Eng} - T_{Acc}) \frac{AxleRatio \cdot TrnRatio}{R_{wheel}} - F_{brake} - \frac{1}{2} \rho C_d A v_{curspeed}^2 - C_{rr} mg \cos(\theta) - mg \sin(\theta)$$

Where, with the transmission disengaged, engine torque (Teng), engine accessory torque (Tacc), and Fbrake are zero. Using the Road Load Equation, it is possible to find out the resultant deceleration $a_{i,t}$(dV/dt), and we know current vehicle speed $v_t$ at a given time t. Assuming that $a_{i,t}$ is constant during a discretized distance $d_{\Delta t}$, we can use Newton's equation of motion for uniform acceleration:

$$V_{t+\Delta t}^2 = V_t^2 + 2 a_{i,t} d_{\Delta t} \Rightarrow V_{t+\Delta t} = \sqrt{V_t^2 + 2 a_{i,t} d_{\Delta t}}$$

(note: must check that the operand of the square root is greater than zero to avoid a complex solution)

FIGS. 6a-6d depict an embodiment of a coasting control scheme structured to provide early engagement of the engine 104 to the driveline 107 to avoid high fueling and acceleration when a relatively large speed loss is predicted that might lead to excessive fueling under standard ICM. Shown in FIG. 6a is a schematic of a vehicle 100 on a downhill grade which ends in an abrupt uphill segment. FIGS. 6b-6d depict various control schemes including a baseline cruise control, an intelligent coasting management (ICM) control scheme (e.g. a standard ICM, or simply ICM), and an ICM control scheme with a horizon look-ahead (e.g. ICM with Horizon). Any of the ICM and ICM with Horizon can be implemented in the CEM 150. The ICM with Horizon control scheme will be described in more detail below, but in general includes the ability to look ahead and use future road conditions/grade to influence control system actions. In this embodiment in FIGS. 6a-6d, it is used to provide an early engagement based on elevation profile of the engine 104 to the driveline 107 relative to standard ICM. The ICM with Horizon feature depicted in the figures includes embodiments of the instant application which assist in providing early engagement.

FIG. 6b depicts operation in ICM in line 910 and ICM with Horizon in line 920, where it can be seen that standard ICM remains in a coasting event longer than ICM with Horizon (in other words, ICM with Horizon engages earlier than standard ICM). The coasting event will be understood as a condition in which the engine 104 is disengaged from driveline 107 in response to coasting opportunity, where ON in FIG. 6b represents a disengagement of the engine 104 from the driveline 107, and OFF represents re-engagement of the engine 107 to the driveline 107.

FIG. 6c depicts the speed profile of the vehicle in which baseline cruise control is shown in line 930, standard ICM is shown in line 940, and ICM with Horizon is shown in line 950. FIG. 6d depicts fuel flow rate of the vehicle in which a baseline cruise control is shown in line 960, standard ICM is shown in line 970, and ICM with Horizon is shown in line 980. A bracket in FIG. 6d illustrates the early engagement when using ICM with Horizon relative to standard ICM. Note that fuel rate spikes in standard ICM, but with early engagement using ICM with Horizon the fuel rate demonstrates a gradual rise toward the baseline, at least with the type of terrain used in the simulation.

Figure 7:
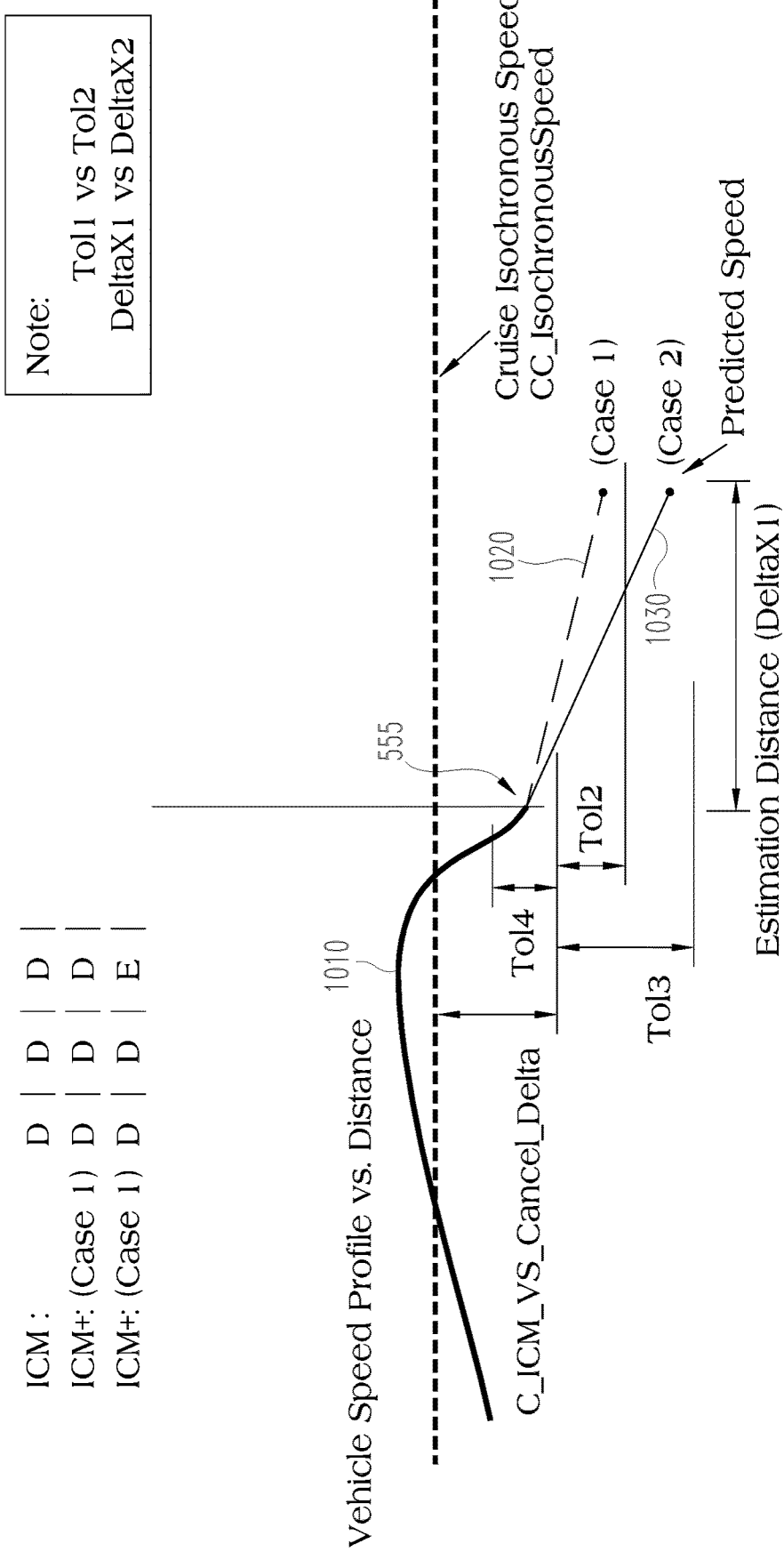
FIG. 7 depicts an embodiment of various cases using predicted speed.

FIG. 7 illustrates two separate cases of ICM with Horizon using the early engagement scheme based on elevation profile and low speed. Line 1010 on the left side of the figure represents instantaneous speed plotted as a function of distance. The ICM with Horizon looks ahead over an estimation distance DeltaX2 at reference point 555 and predicts speed of the vehicle at the estimation distance. By way of comparison to the distance DeltaX1, in the embodiments described herein DeltaX1 can be the same or different as DeltaX2. In one embodiment the look ahead speed estimation will only be done once the instantaneous speed is below the Tol4 line. In the first of the two cases illustrated, line 1020 predicts that speed will remain above Tol2, thus the engine 104 and driveline 107 will continue to be commanded to remain disengaged. However, if instantaneous speed during this time drops below the Tol3 line even though estimated speed remains above Tol2, ICM with Horizon can command re-engagement of the engine 104 to the driveline 107. In the second case, line 1030 predicts that speed will drop below Tol2, thus the engine 104 and driveline 107 will be commanded to re-engage.

Figure 8:
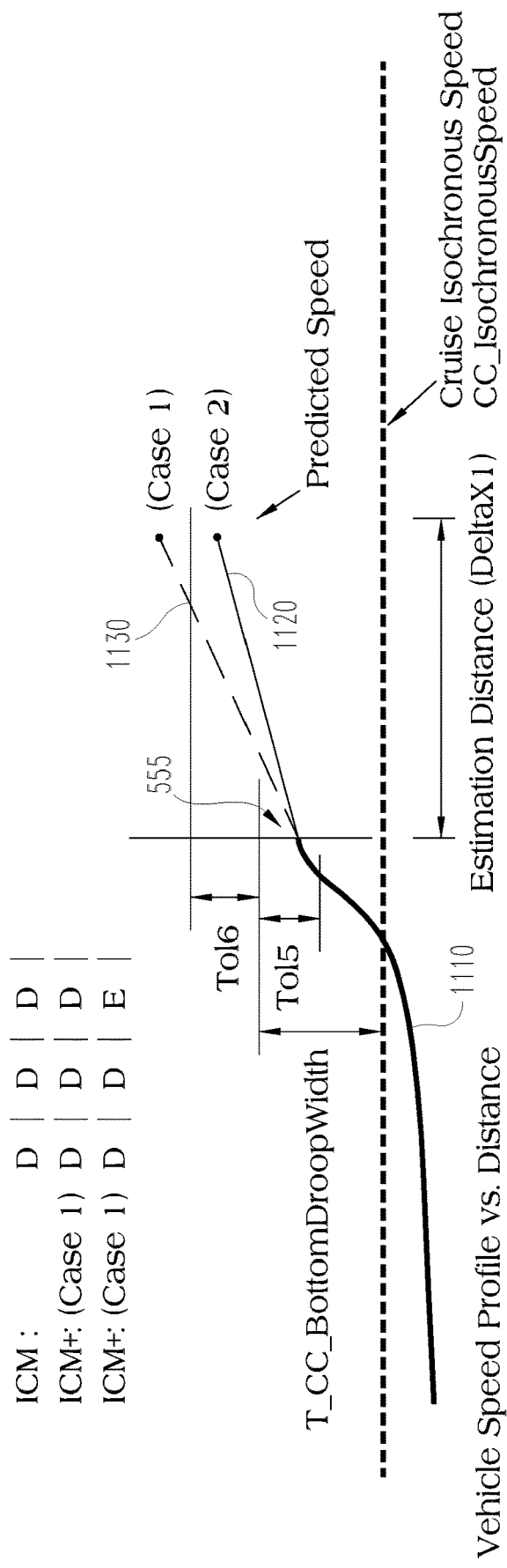
FIG. 8 depicts an embodiment of various cases using predicted speed.

FIG. 8 illustrates two separate cases of ICM with Horizon using an additional and/or alternative early engagement scheme, but one in which provides early engagement for high speed. Line 1110 on the left side of the figure represents instantaneous speed plotted as a function of distance. The ICM with Horizon looks ahead over an estimation distance DeltaX2 at reference point 555 and predicts speed of the vehicle at the estimation distance. In one embodiment the look ahead speed estimation will only be done once the instantaneous speed is above the Tol5 line. In the first of the two cases illustrated, line 1120 predicts that speed will remain below Tol6, thus the engine 104 and driveline 107 will continue to be commanded to remain disengaged. However, if instantaneous speed rises above another threshold, such as a BottomDroopWidth which may be a speed above the Tol6 line, even though estimated speed remains below Tol6, ICM with Horizon can command re-engagement of the engine 104 to the driveline 107. In the second case, line 1130 predicts that speed will rise above Tol6, thus the engine 104 and driveline 107 will be commanded to re-engage.

The reduced frequency re-engagement, early engagement low speed, and early engagement high speed embodiments described above can stand alone in some implementations, but in other implementations can be combined with each other. For example, the reduced frequency embodiment can be combined with either of the early engagement embodiments. Either of the early engagement embodiments can be combined with any of the other embodiments. Still further, all embodiments can be combined together in any given implementation.

Various details with respect to certain embodiments of ICM with Horizon are described, such as entry conditions, speed prediction, types of vehicles contemplated, etc. Objectives include to reduce fuel consumption and frequency of idle coasting disengage/reengage by projecting vehicle speed and determining if a speed recovery is expected take place. If a speed recovery is expected to take place, keep transmission disengaged and coast. If a speed recovery is not expected, reengage transmission sooner to reduce torque spikes during re-engagement. Requirements include an eHorizon system provides look-ahead data for road grade and transmission integration allowing for idle coasting.

Constraints include entry conditions such as idle coasting is active (ICM Mode=ICM_ACT), eHorizon grade information is present and valid, vehicle speed above (>) tolerance Tol3 (with respect to Cancel_Delta). This considers incorrect speed prediction due to uncertain vehicle loads, environment, road grade or un-modeled dynamics. Also, a fixed distance prediction window for vehicle speed, e.g. predict vehicle speed at 0.1 km when entry conditions are valid. Other constraints include speed prediction to predict vehicle speed based on vehicle load (aero, rolling and grade: VPD with grade eHorizon), set keep disengaged flag to true if predicted speed is above tolerance Tol1 (with respect to Cancel_Delta), if predicted speed is below Tol2 (with respect to Cancel_Delta) and vehicle speed is below CC_IsochronousSpeed−C_ICM_VS_Cancel_Delta+Tol4, then re-engage transmission to reduce torque spikes during re-engagement.

Various inputs and outputs are useful to implement certain embodiments of ICM with Horizon. Inputs include current vehicle speed $V_{current}$, cruise isochronous speed, grade look-ahead, look-ahead data resolution (there is also a function call to the vehicle parameter determination (VPD) subsystem), MME Mass. Outputs includes remain dis-engaged when:

$V_{predicted} \geq (\text{Iso}-\text{CancelDelta}-\text{Tol1})$ AND $V_{current} \leq (\text{Iso}-\text{CancelDelta})$ AND $V_{current} > (\text{Iso}-\text{CancelDelta}-\text{Tol3})$.

In addition, outputs include early re-engage when:

$V_{predicted} < (\text{Iso}-\text{CancelDelta}-\text{Tol2})$ AND $V_{current} < (\text{Iso}-\text{CancelDelta}+\text{Tol4})$ AND $V_{current} > (\text{Iso}-\text{CancelDelta})$ OR $V_{current} \leq (\text{Iso}-\text{CancelDelta}-\text{Tol3})$.

Iso is also cruise isochronous speed.

Figure 9:
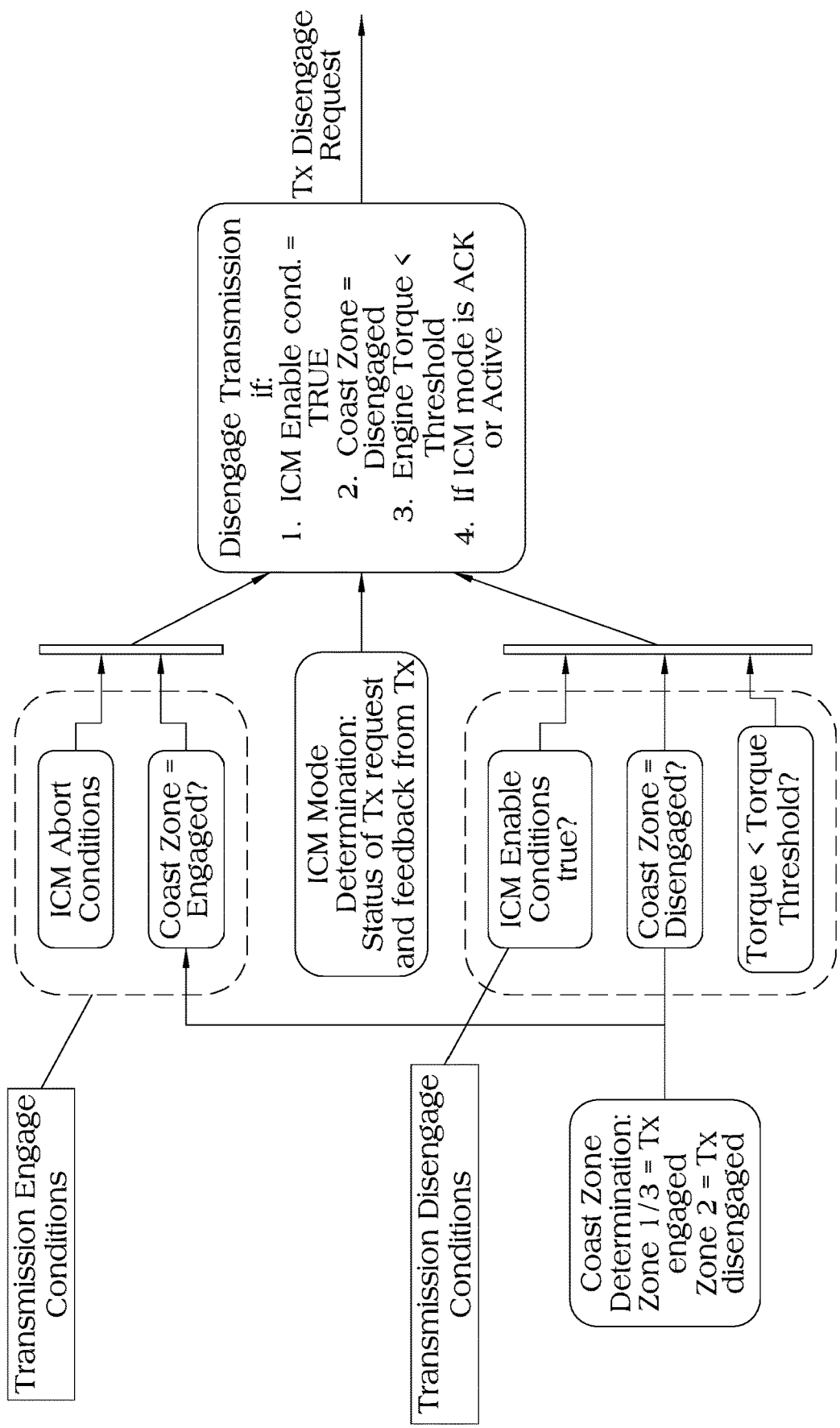
FIG. 9 is a block diagram of an embodiment of ICM.

FIG. 9 is a block diagram of an embodiment of ICM (whether standard ICM, ICM with Horizon, etc).

Figure 10:
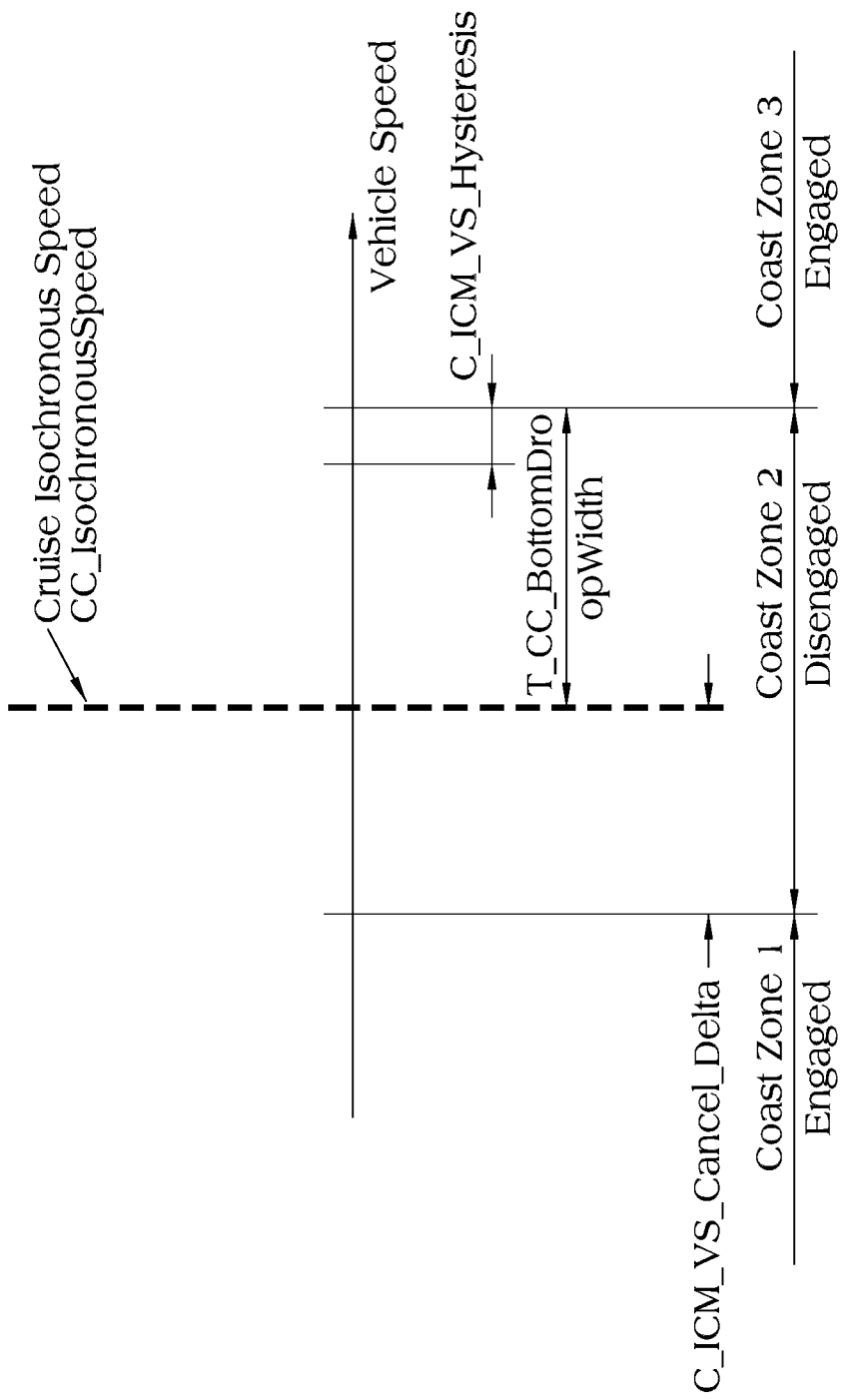
FIG. 10 is a depiction of Idle Coasting without Horizon.

FIG. 10 is a depiction of Idle Coasting without Horizon and coast zone determination logic. In FIG. 10 coast zone 1 is:

Vehicle Speed<(Iso-$C\_ICM\_VS\_Cancel\_Delta$)

Coast zone 2 is:

Vehicle Speed>(Iso-$C\_ICM\_VS\_Cancel\_Delta$) and

<(Iso+$T\_CC\_BottomDroopWidth$) with a top re-entry hysteresis of

<(Iso+$T\_CC\_BottomDroopWidth-C\_ICM\_VS\_Hysteresis$).

Coast zone 3 is:

Vehicle Speed>(Iso+$T\_CC\_BottomDroopWidth$) with an exit hysteresis of (Iso+$T\_CC\_BottomDroopWidth-C\_ICM\_VS\_Hysteresis$).

Figure 11:
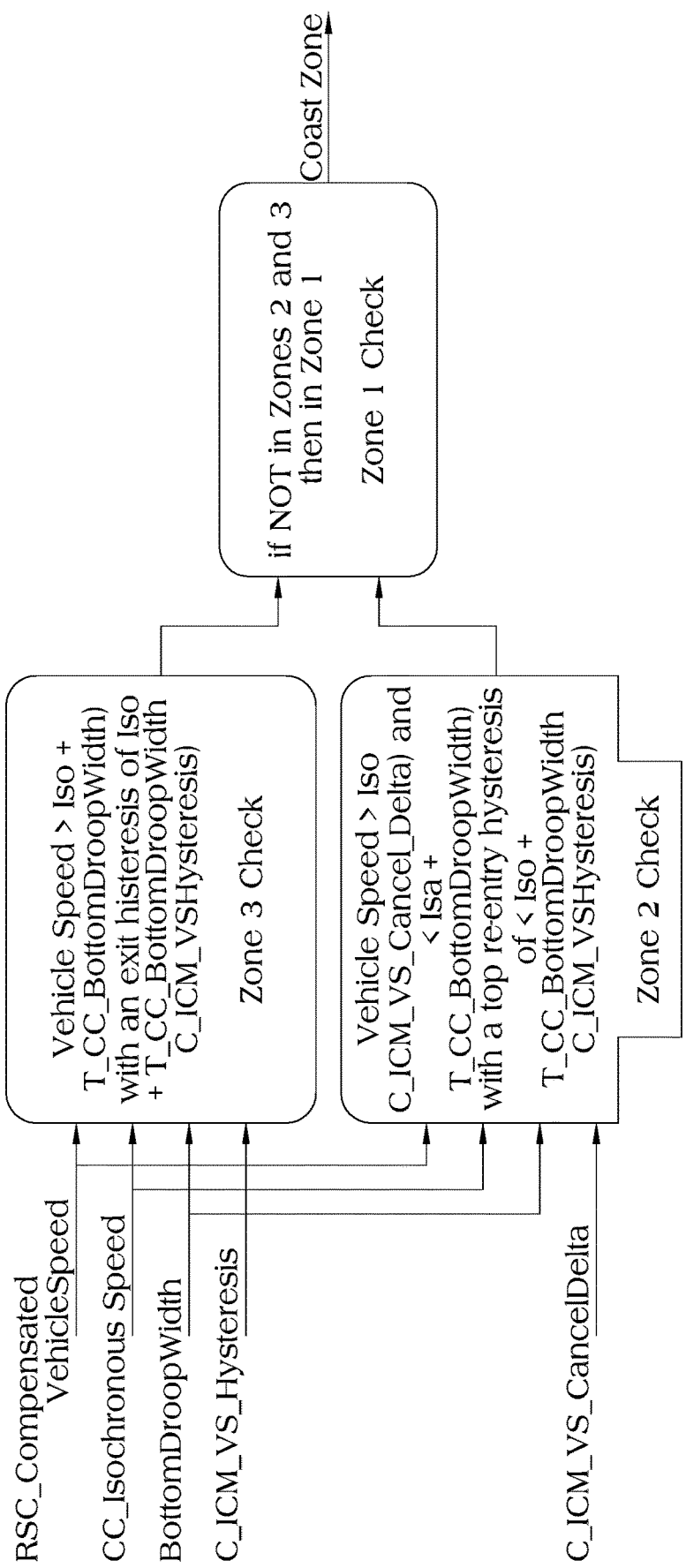
FIG. 11 is a depiction of Idle Coasting without Horizon.

FIG. 11 is a depiction of Idle Coasting without Horizon and coast zone determination.

Figure 12:
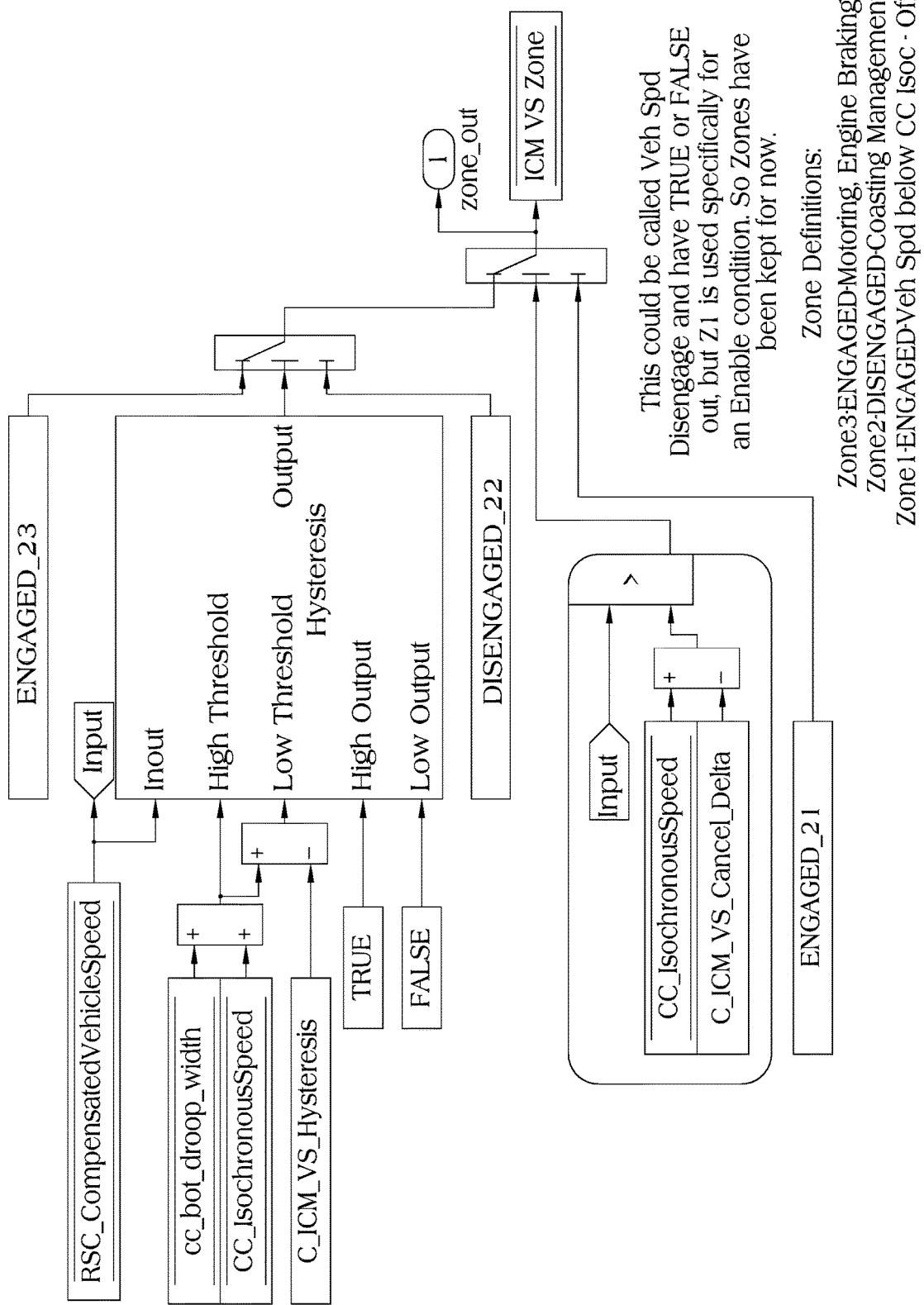
FIG. 12 depicts a block diagram implementation of one embodiment of Idle Coasting without Horizon.

FIG. 12 depicts a block diagram implementation of one embodiment of Idle Coasting without Horizon for coast zone determination.

Figure 13:
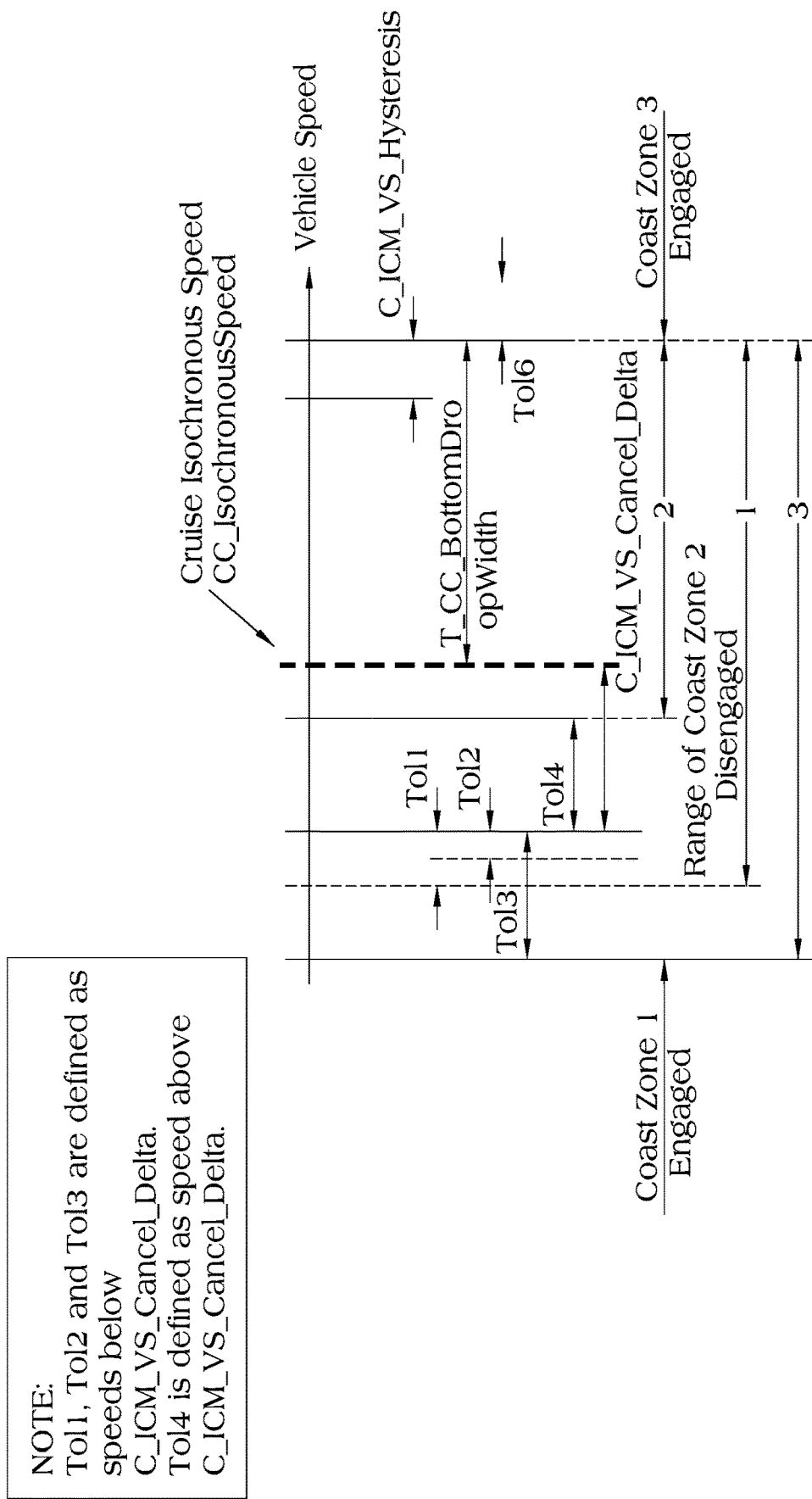
FIG. 13 depicts aspects of ICM with Horizon.

FIG. 13 depicts aspects of ICM with Horizon. The disengage zone can be extended below Cancel_Delta if speed is projected to not fall below Tol1 line, otherwise engage. The disengage zone is reduced to Tol4 line if speed is projected to fall below Tol2 line, and engaged if current speed falls below Tol3 line.

Figure 14:
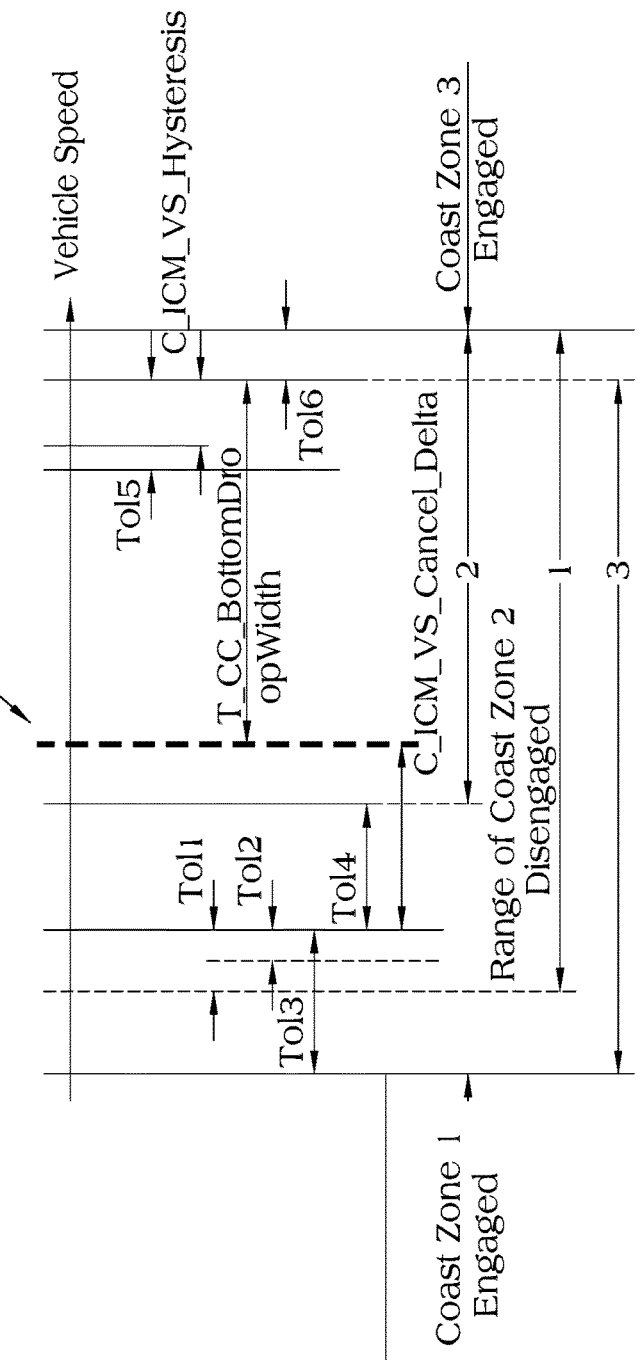
FIG. 14 depicts aspects of ICM with Horizon.

FIG. 14 depicts aspects of ICM with Horizon. In FIG. 14 the disengage zone is extended below Cancel_Delta if speed is projected to not fall below Tol1 line or above Tol6 line, otherwise engage. The disengage zone is reduced to Tol4 line if speed is projected to fall below Tol2 line, and engaged if current speed falls below Tol3 line.

Figure 15:
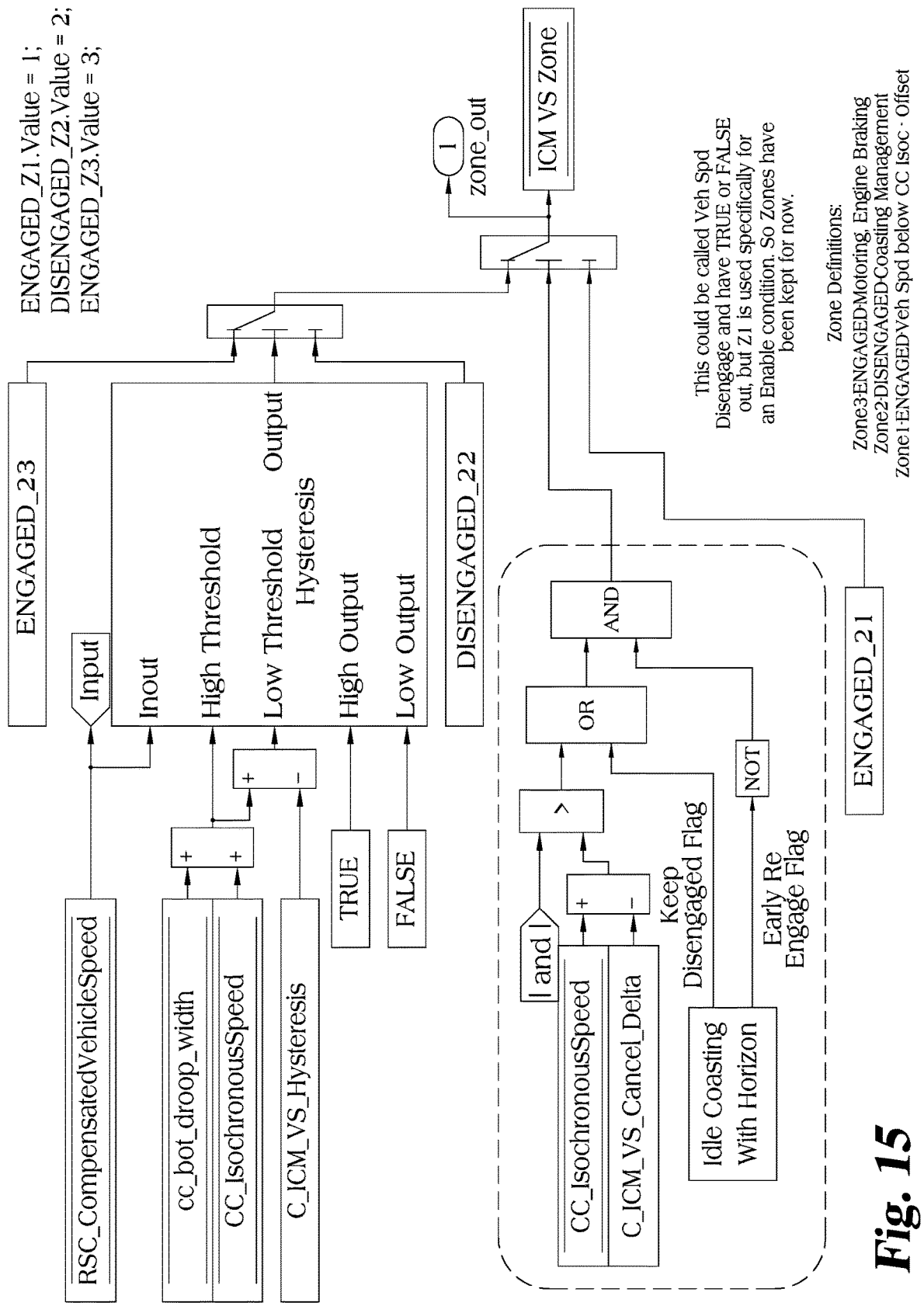
FIG. 15 depicts a block diagram implementation of one embodiment of Idle Coasting with Horizon.

FIG. 15 depicts a block diagram implementation of one embodiment of Idle Coasting with Horizon.

Figure 16:
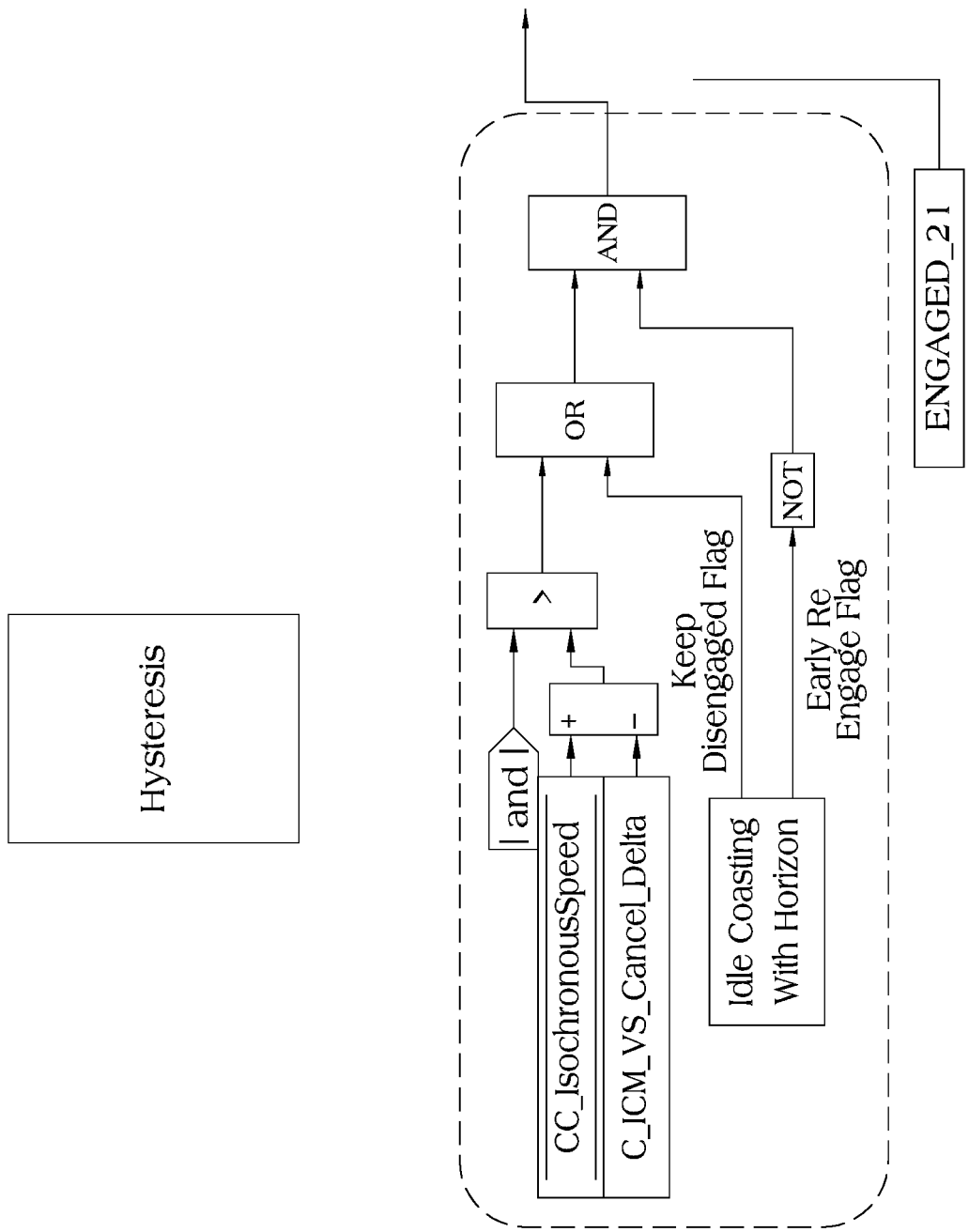
FIG. 16 depicts a block diagram implementation of one embodiment of Idle Coasting with Horizon.

FIG. 16 depicts a block diagram implementation of one embodiment of Idle Coasting with Horizon.

Figure 17:
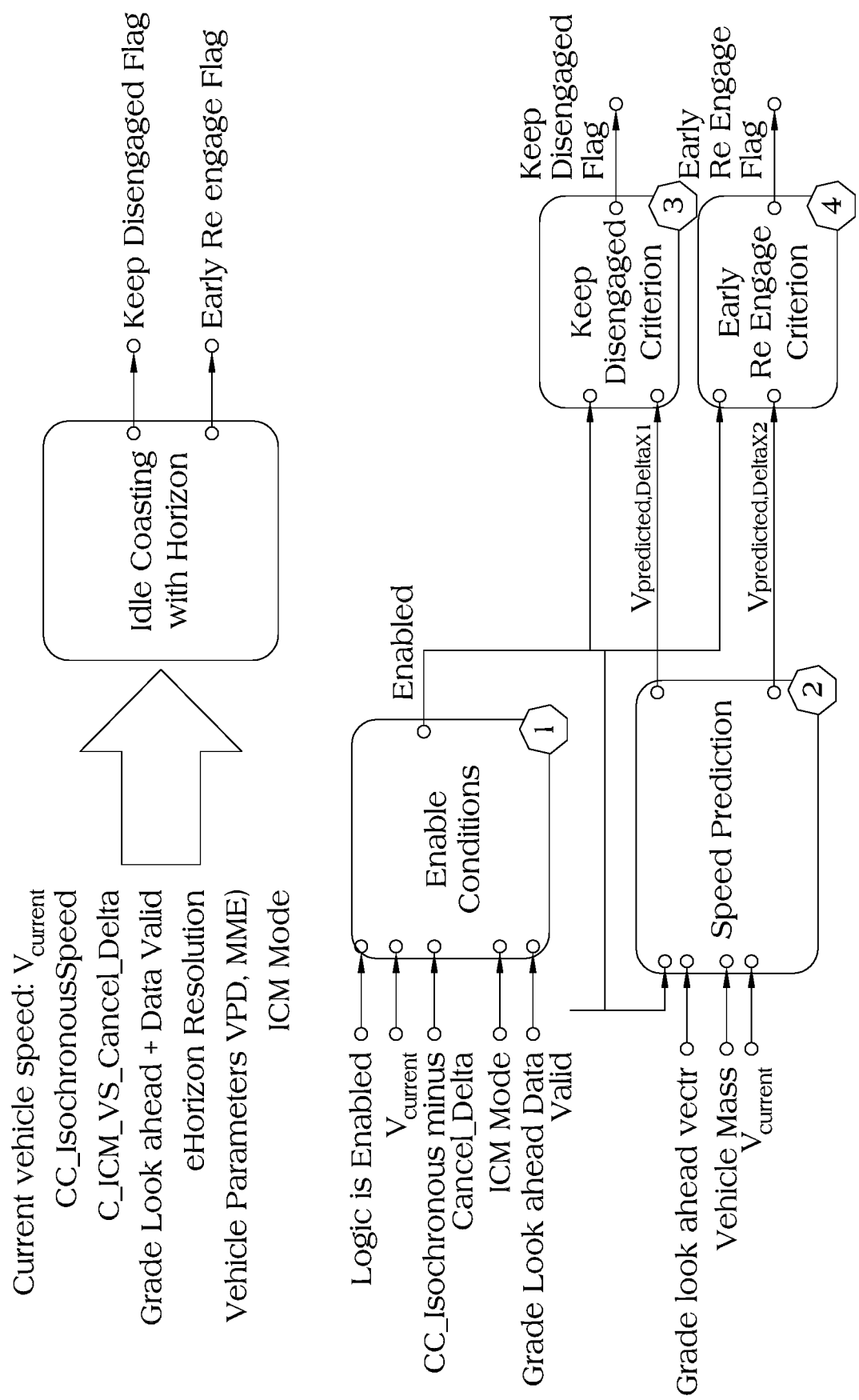
FIG. 17 depicts an embodiment of Idle Coasting with Horizon.
Figure 19:
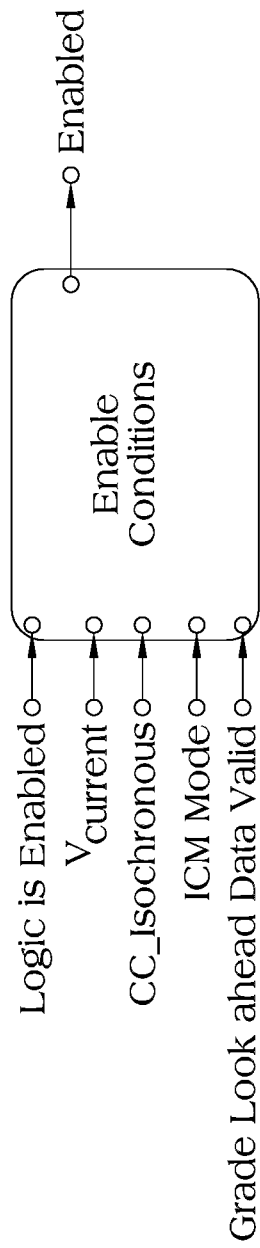
FIG. 19 depicts an embodiment of "Enable Conditions."
Figure 20:
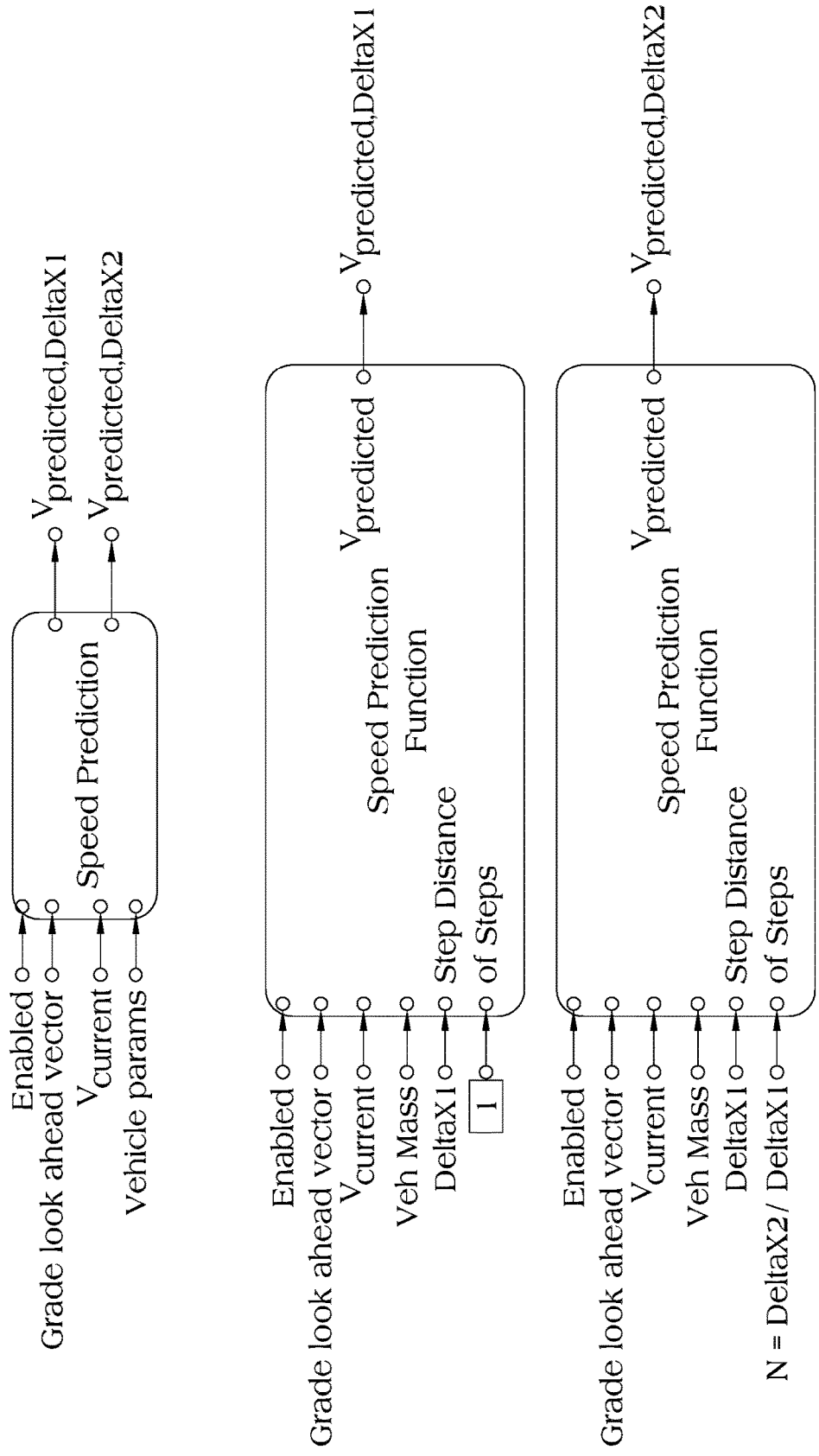
FIG. 20 depicts an embodiment of "Speed Protection."
Figure 21:
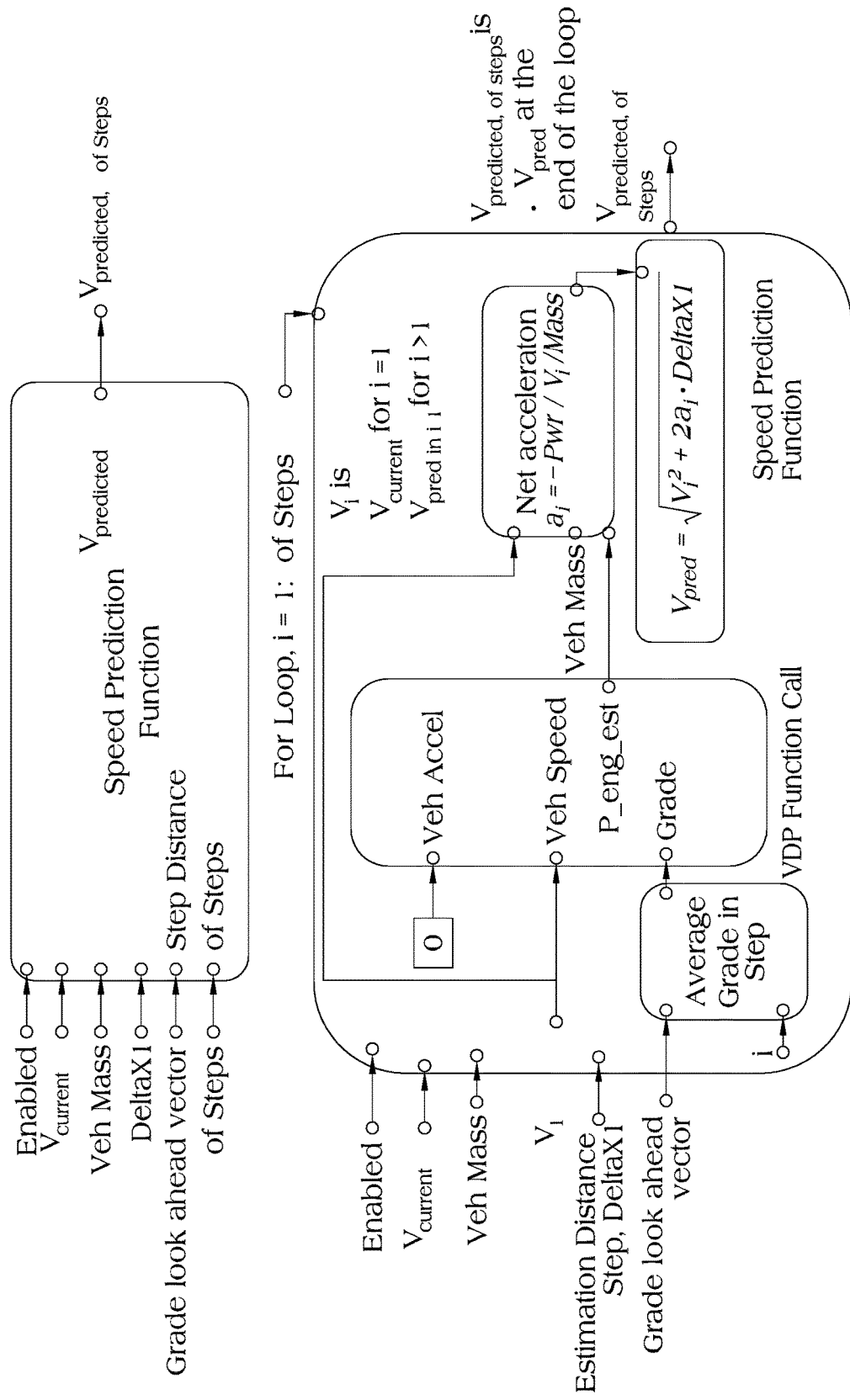
FIG. 21 depicts an embodiment of "Speed Protection."
Figure 22:
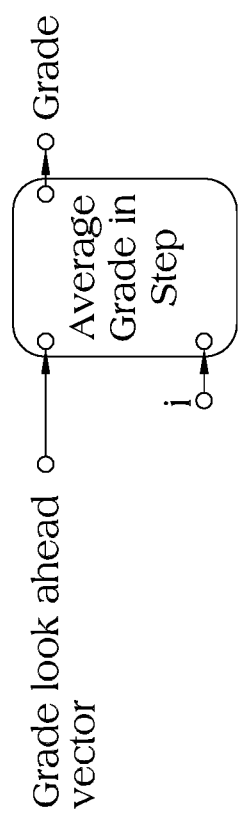
FIG. 22 depicts an aspect of one embodiment of "Speed Protection."
Figure 23:
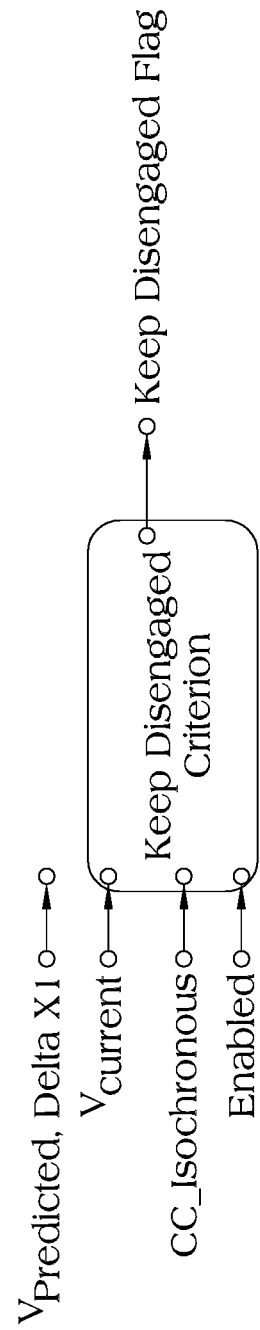
FIG. 23 depicts an embodiment of the Keep Disengaged Criterion.
Figure 24:
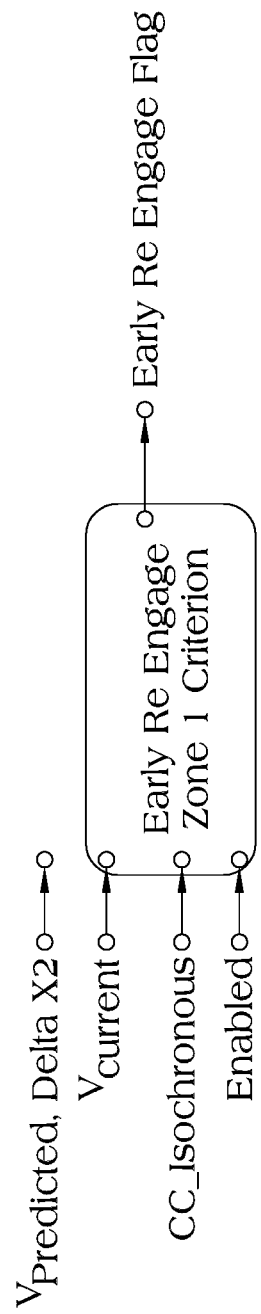
FIG. 24 depicts an embodiment of Early Re-engage Zone 1 Criterion.
Figure 25:
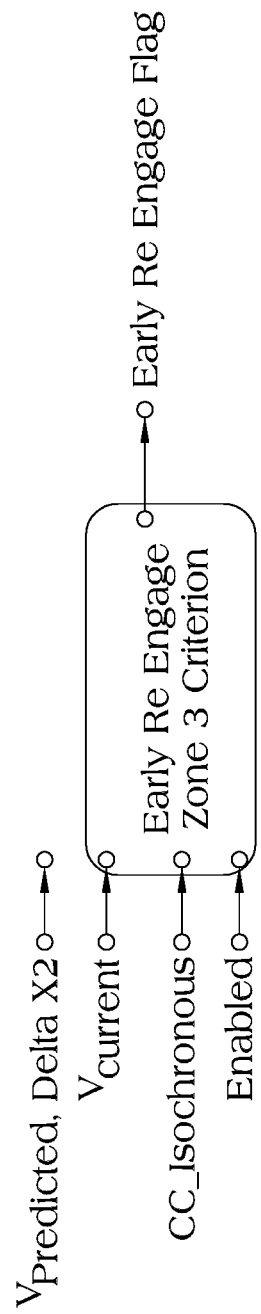
FIG. 25 depicts an embodiment of Early Re-engage Zone 3 Criterion.

FIG. 17 depicts an embodiment of Idle Coasting with Horizon in which a few numbered features are described further below. For example, the block Enable Conditions is labeled with a number "1" which corresponds to a description below related to that topic as shown in FIG. 19 in which the Enable Conditions are labelled with a numeral "1." at the top of the figure. Likewise the number "2" corresponds to a description below related to that topic as shown in FIGS. 20-22 in which the "Speed Prediction" are labelled with numeral "2" at the top of the figure. FIGS. 23, 24 and 25 correspond to the numbered blocks in FIG. 17 much like FIGS. 19-22.

Figure 18:
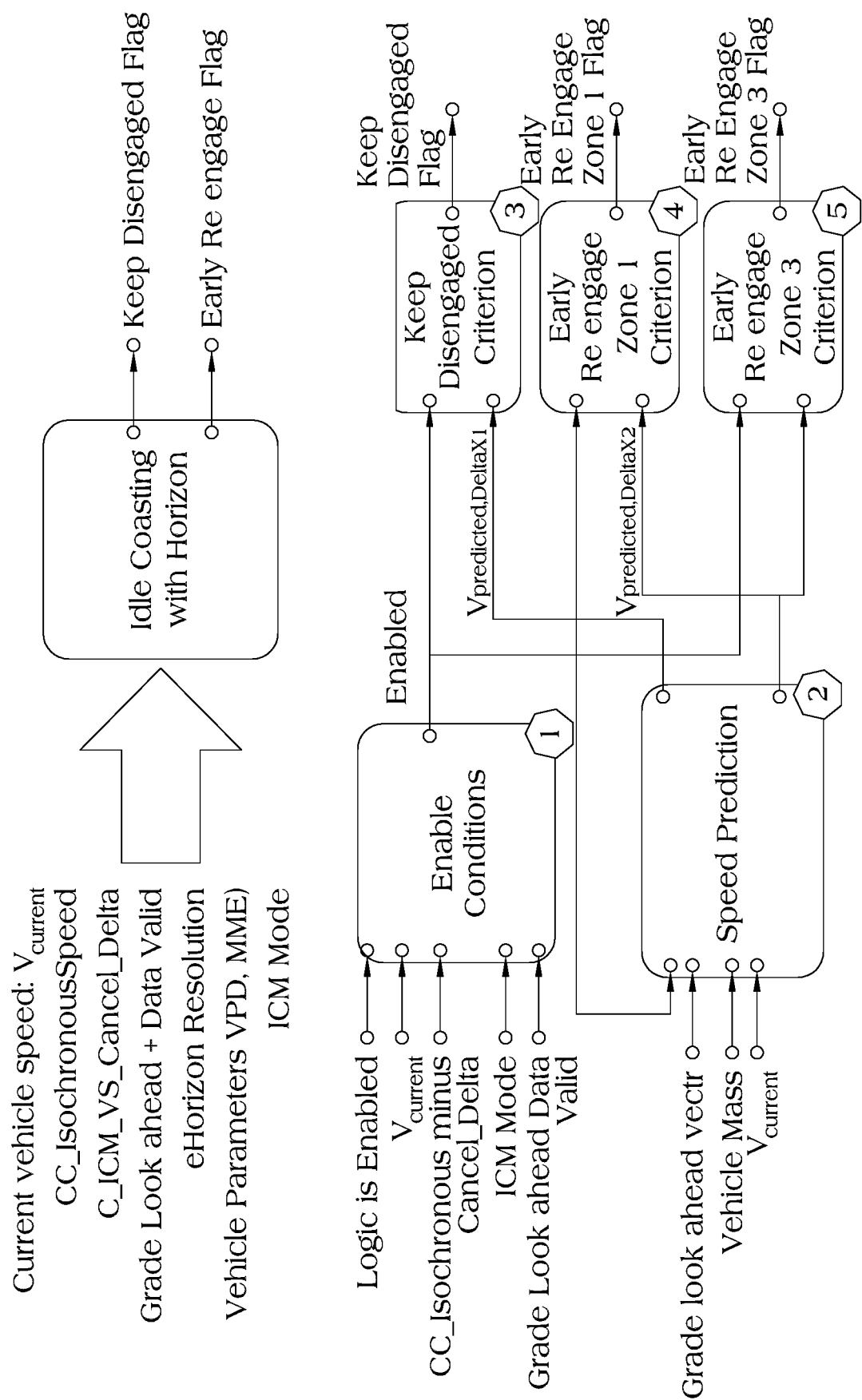
FIG. 18 depicts an embodiment of Idle Coasting with Horizon.

FIG. 18 depicts an alternative and/or additional embodiment of Idle Coasting with Horizon in which a few numbered features are described further below. For example, the block "Enable Conditions" is labeled with a number "1" which corresponds to a description below related to that topic as shown in FIG. 19 in which the Enable Conditions are labelled with a numeral "1." at the top of the figure. Likewise the number "2" corresponds to a description below related to that topic as shown in FIGS. 20-22 in which the "Speed Prediction" are labelled with numeral "2" at the top of the figure. FIGS. 23, 24 and 25 correspond to the numbered blocks in FIG. 18 much like FIGS. 19-22.

FIG. 19 depicts an embodiment of Enable Conditions listed above in FIGS. 17 and 18. Enable Conditions include ICM Mode is Active (==ICM_ACT); eHorizon grade information is valid (RoadAheadGradeDistanceValid>=Estimation Distance, DeltaX1); Logic is Enabled (enable parameter is true, T_ or C_); vehicle speed is above CC_IsochronousSpeed-C_ICM_VS_Cancel_Delta-Tol3; and vehicle speed is below CC_IsochronousSpeed+T_CC_BottomDroopWidth+Tol6.

FIG. 20 depicts an embodiment of Speed Protection listed above in FIGS. 17 and 18.

FIG. 21 depicts an alternative and/or additional embodiment of Speed Protection listed above in FIGS. 17 and 18.

FIG. 22 depicts an aspect of one embodiment of Speed Protection listed above in FIGS. 17 and 18. A grade look-ahead vector has a number of elements: grade_vector [1, 2, . . . , 20]. Grade output is equal to the arithmetic mean of the elements i and i+1 of the grade look-ahead vector:

Grade=(grade_vector[$i$]+grade_vector[$i$+1])/2.

This assumes that look-ahead resolution is the same as DeltaX1, and as such the Grade output is equivalent to the average grade in the estimation distance.

FIG. 23 depicts an embodiment of the Keep Disengaged Criterion listed above in FIGS. 17 and 18. The Keep Disengaged Flag is true if:

$V_{predicted,DeltaX1} \geq (CC\_IsochronousSpeed-C\_ICM\_VS\_Cancel\_Delta-\text{Tol1})$

AND $V_{current} \leq (CC\_IsochronousSpeed-C\_ICM\_VS\_Cancel\_Delta)$.

If else, the Keep Disengaged Flag false. Also, the flag is false if Enable is not active.

FIG. 24 depicts an embodiment of Early Re-engage Zone 1 Criterion listed above in FIGS. 17 and 18. Zone 1 corresponds to the low speed re-engage. The Early Re-engage Flag (i.e. re-engage transmission) is true if:

$V_{predicted,DeltaX2} < (\text{Iso}-\text{CancelDelta}-\text{Tol2})$ AND $V_{current} \leq (\text{Iso}-\text{CancelDelta}+\text{Tol4})$ AND $V_{current} > (\text{Iso}-\text{CancelDelta})$ If else, keep the Early Re-engage Flag False. Also the flag is false if Enable is not active.

FIG. 25 depicts an embodiment of Early Re-engage Zone 3 Criterion listed above in FIG. 18. Zone 3 corresponds to the high speed re-engage. The Early Re-engage Flag (i.e. re-engage transmission) is true if:

$$V_{predicted\_DeltaX3} > (\text{Iso} + \text{BottomDroopWidth} + \text{Tol6})$$
AND $$V_{current} > (\text{Iso} + \text{BottomDroopWidth} - \text{Tol5}) \text{ AND}$$

$$V_{current} < (\text{Iso} + \text{BottomDroopWidth})$$

If else, keep the Early Re-Engage flag false. Also, the flag is false if Enable is not active.

FIG. 26 depicts possible values for a number of variables, such as Tol1, DeltaX2, etc.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a vehicle in a coasting mode in which a driveline is disengaged from an engine of the vehicle upon command of a vehicle controller, the vehicle controller structured to re-engage the driveline to the engine if an instantaneous speed falls below a pre-set speed by a first threshold;
   computationally determining a predicted future speed of the vehicle as a result of road conditions upon which the vehicle is travelling;
   comparing the predicted future speed of the vehicle against a threshold;
   suppressing re-engagement of the driveline to the engine even if the instantaneous speed falls below the first threshold to extend operation of the vehicle in the coasting mode, such suppression based upon an increase in the predicted future speed satisfying an inequality condition.

2. The apparatus of claim 1, wherein the predicted future speed of the vehicle is calculated at a pre-selected distance in front of the vehicle.

3. The apparatus of claim 1, wherein the predicted future speed of the vehicle is calculated from a physics based model of vehicle performance which includes a look ahead window of an upcoming terrain grade upon which the vehicle is predicted to traverse.

4. The apparatus of claim 3, wherein the inequality condition includes comparing the predicted future speed to a second threshold which is greater than the first threshold such that re-engagement is suppressed if the predicted future speed remains within the second threshold.

5. The apparatus of claim 4, wherein the inequality condition includes comparing the instantaneous speed to a third threshold which is greater than the first threshold such that re-engagement is also suppressed if the instantaneous speed remains within the third threshold.

6. The apparatus of claim 3, wherein the inequality condition includes: comparing the predicted future speed to a future speed lower limit which is lower than the first threshold and re-engaging if the predicted future speed falls below the future speed lower limit; and comparing the instantaneous speed to an instantaneous lower limit and re-engaging if the instantaneous speed falls below the instantaneous lower limit.

7. The apparatus of claim 6, wherein the instantaneous lower limit is a lower speed than the future speed lower limit, and which further includes re-engaging the driveline to the engine when: (1) the instantaneous speed remains between the pre-set speed and the first threshold and within a pre-determined offset from the first threshold; and (2) the predicted future speed falls below an early engagement threshold.

8. An apparatus comprising:
   a coasting controller for a vehicle having an engine structured to provide motive power to the vehicle, the coasting controller structured to:
   command disengagement of a driveline from an engine at a coast speed such that the motive power is not delivered to a driven wheel of the vehicle so the vehicle operates in a coasting mode;
   re-engage the driveline to the engine if a current vehicle speed falls below a minimal threshold speed offset from the coast speed;
   predict a future speed of the vehicle; and
   suppress re-engagement of the driveline to the engine even if the current vehicle speed falls below the minimal threshold speed to extend operation in the coasting mode when the controller detects that an inequality condition is satisfied based upon an increase in the future speed of the vehicle.

9. The apparatus of claim 8, wherein the future speed is predicted based upon a model of vehicle performance that takes into account aerodynamic resistance, rolling resistance, terrain grade, and driveline losses.

10. The apparatus of claim 9, wherein the future speed is based upon traversing a length of road ahead of the vehicle.

11. The apparatus of claim 10, wherein the inequality condition includes comparing the future speed against a future speed threshold which is lower than the minimal threshold speed and suppressing re-engagement if the future speed is above the future speed threshold.

12. The apparatus of claim 11, which further includes re-engaging the driveline to the engine when the current vehicle speed is above the minimal threshold and the future speed is lower than an early engagement threshold.

13. The apparatus of claim 12, wherein the early engagement threshold is different than the future speed threshold.

14. The apparatus of claim 13, wherein the re-engaging the driveline to the engine when the current speed is above the minimal threshold further includes the condition that the current speed is within a band above the minimal threshold but where such band is below the coast speed.

15. An apparatus comprising:
   a vehicle having an internal combustion engine structured to provide motive power to a driveline; and
   a vehicle coasting control system configured to regulate engagement of the engine with the driveline to allow for a coasting event, the coasting control system having a speed estimator structured to predict a future speed of the vehicle in light of upcoming road conditions, the coasting control system structured to command disengagement of the engine at a coast speed from the driveline to enable a coasting condition for the vehicle, re-engage the engine to the driveline when current speed is below a threshold offset speed, and to suppress re-engagement of the engine to the driveline based upon an increase in the future speed satisfying an inequality to extend operation of the vehicle in the coasting condition below the threshold offset speed.

16. The apparatus of claim 15, wherein the speed estimator includes a physics based model that predicts the future speed of the vehicle at a pre-determined distance in front of the vehicle.

17. The apparatus of claim 15, wherein the inequality compares the future speed with a future speed threshold, wherein re-engagement is suppressed when the future speed is above the future speed threshold, and wherein the future speed threshold is lower than the threshold offset speed.

18. The apparatus of claim 17, wherein the vehicle coasting control system is further configured to re-engage the engine to the driveline regardless if the inequality is satisfied when a current speed of the vehicle falls below a minimal current speed threshold, the minimal current speed threshold lower than the threshold offset speed.

19. The apparatus of claim 18, wherein the minimal current speed threshold is lower than the future speed threshold.

20. The apparatus of claim 19, wherein the vehicle coasting control system is further configured to re-engage the engine to the driveline when: (1) the current speed is above the threshold offset speed; and (2) the future speed is lower than an early engagement threshold.

* * * * *